(12) United States Patent
Sano

(10) Patent No.: US 7,777,901 B2
(45) Date of Patent: Aug. 17, 2010

(54) IMPOSITION APPARATUS FOR ARRANGING PAGES AND IMPOSITION PROGRAM STORAGE MEDIUM

(75) Inventor: Tetsuya Sano, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1969 days.

(21) Appl. No.: 10/721,342

(22) Filed: Nov. 26, 2003

(65) Prior Publication Data

US 2004/0105128 A1 Jun. 3, 2004

(30) Foreign Application Priority Data

Nov. 28, 2002 (JP) ............................. 2002-346004
Dec. 9, 2002 (JP) ............................. 2002-356533

(51) Int. Cl.
*G06K 15/00* (2006.01)
*G03G 15/045* (2006.01)

(52) U.S. Cl. ..................... 358/1.14; 358/1.18; 399/157
(58) Field of Classification Search .................. 358/1.9, 358/1.18, 3.27; 347/5; 399/157
See application file for complete search history.

(56) References Cited

U.S. PATENT DOCUMENTS

| | | | |
|---|---|---|---|
| 5,337,668 A | * | 8/1994 | Matsuoka et al. ........... 101/481 |
| 6,950,206 B1 | * | 9/2005 | Karsten et al. ............. 358/1.18 |
| 7,190,469 B1 | * | 3/2007 | Gomi ........................ 358/1.14 |
| 2002/0036665 A1 | * | 3/2002 | Shima ........................... 347/5 |
| 2002/0051139 A1 | * | 5/2002 | Akabane et al. .............. 358/1.2 |
| 2003/0035672 A1 | * | 2/2003 | Kidani et al. .................. 400/74 |
| 2003/0053096 A1 | * | 3/2003 | Nagata ....................... 358/1.9 |

FOREIGN PATENT DOCUMENTS

| JP | 11192761 A | * | 7/1999 |
|---|---|---|---|
| JP | 11-216924 (A) | | 8/1999 |

* cited by examiner

*Primary Examiner*—Twyler L Haskins
*Assistant Examiner*—Vincent Rudolph
(74) *Attorney, Agent, or Firm*—Sughrue Mion, PLLC

(57) ABSTRACT

An imposition for at least one page frame is applied onto a paper, and a page is disposed in the page frame on a layout in which an imaginary page frame including the page frame is set up. At that time, in the event that the page disposed on the layout juts out the imaginary page frame, a processing interruption section interrupts a series of processing of creating the paper image and outputting the created paper image to the paper, or a paper image creating section creates a paper image after the size adjustment of coinciding the page with the imaginary page frame.

9 Claims, 20 Drawing Sheets

IMPOSITION APPARATUS FOR ARRANGING PAGES AND IMPOSITION PROGRAM STORAGE MEDIUM

BACKGROUND OF THE INVENTION

1. Field of the Invention

The present invention relates to an imposition apparatus in which an imposition for arranging pages for a book and the like is applied to a paper and a paper image representative of the whole of the paper is outputted, and an imposition program storage medium storing an imposition program which causes a computer to operate as the imposition apparatus when the imposition program is incorporated into the computer and is executed in the computer.

2. Description of the Related Art

Hitherto, in the field of a printing technology, there is widely applied a DTP (Desk Top Publishing) in which a computer is used to perform a work for editing. The DTP implements an idea of WYSIWYG (What You See Is What You Get). An operator performs editing for characters and images while looking a display screen, and can perform printing and plate making for images and the like by a printer and an imagesetter upon confirmation of an image of the printed matter.

In the DTP, software, which is used when an operator edits characters and images, is generally called DTP software. The DTP software generates data of a format referred to as page description data representative of an image every page in accordance with characters and images edited by the operator. An output device such as a printer cannot output the page description data per se. For this reason, a RIP (Raster Image Processor) is used to convert the page description data into bit map data (dot image of data) capable of being outputted by the output device, so that the output device creates a printed matter in accordance with the bit map data.

For example, when a printed matter, such as a book and the like consisting of a plurality of pages, is created, a plurality of arranging pages is printed on a sheet of large paper through an imposition, and the paper is folded and cut harmonizing with the trim size into bookbinding. In the imposition processing, hitherto, an operator arranges pages after editing one by one on a paper. However, recently, there is widely known an imposition application that previous designation of a size of a paper and a page size of a book may create an imposition layout, and a plurality of pages edited by an operator is fed to the imposition layout so that an arrangement is automatically carried out (for example, Japanese Patent Application Laid Open Gazette TokuKai Hei. 11-216924). Hereinafter, there will be explained a series of work in which the imposition application is used to carry out an imposition for arranging pages, so that a book constituted of the arranging pages is bound.

FIG. 1 is an explanatory view useful for understanding a series of processing that arranging pages edited by an operator are disposed in an imposition layout, printed, and bound.

First, an operator edits arranging pages and designates a paper size of a paper on which the pages are disposed and a page size in a bookbinding. The imposition application creates an imposition layout in accordance with the paper size and the page size.

A step (A) of FIG. 1 shows a page 1 edited by an operator. A step (B) of FIG. 1 shows a part (a page corresponding) of the imposition layout created by the imposition application. A layout 2 is provided with a page frame 4 indicative of a page size at the time of bookbinding and a bleed frame 3 including a bleed 5 formed around the page frame 4. A size of the page 1 shown in the step (A) of FIG. 1 is larger than the page frame 4 of the layout 2.

After the imposition application creates the imposition layout, the imposition application arranges the page 1 on the layout 2 coinciding the center of the page 1 with the center of the layout 2.

A step (C) of FIG. 1 shows an image where the page 1 is arranged on the layout 2 coinciding the center of the page 1 with the center of the layout 2. An image portion 6 included in the page 1 does not go into the page frame 4 and projects into the bleed 5. In this state, an image wherein the page 1 and other pages are arranged on the imposition layout, is printed on a paper and the paper is folded and cut harmonizing with the page frame 4 into bookbinding.

When papers are cut, it happens that the papers get out of position because a large amount of papers is cut at once, and thus it is not sure that the whole printed matters are cut with the complete harmonization with the page frame. For this reason, in the event that images involved in spread pages are barely arranged on the page frame, there is a possibility that a streak occurs on the boundary between pages when papers are cut into bookbinding. In order to prevent this, the imposition layout prepares beforehand the bleed 5 formed around the page frame 4 as in the layout 2, and a size of pages after editing is selected to be larger somewhat than the page frame 4 as in the page 1 so that papers are folded and cut to meet the page frame 4 after printing.

A step (D) shows the page 1 after bookbinding, and page 7 bound as a spread page of the page 1 at the time of bookbinding. An image portion 6 is cut with a portion involved in the bleed 5 so that the page 1 is of a size to meet the page frame 4. Between the image portion 6 of the page 1 and the image portion 8 of the page 7, there is no break, and the image portion 6 of the page 1 and the image portion 8 of the page 7 are completely coupled with one another.

In the manner as mentioned above, the arranging pages edited by an operator are subjected to the imposition and printed into bookbinding.

As mentioned above, in the event that the imposition application is used to automatically perform the imposition processing, when a page larger than the trim size is entered, the page is treated as a page taking the bleed into consideration.

However, according to the prior art, even in a case where an apparently mistaken size of page is entered, for example, a size A3 of page is entered for a trim size A4 of imposition layout, there is a possibility that the page is dealt with as a page taking the bleed into consideration and a printing is carried out. Usually, a plurality of pages is printed in bulk. And thus an occurrence of the printing error as mentioned above may use a large amount of unnecessary papers and takes a lot of time and labor for confirming images on the printed paper one by one. This causes the printing cost to be increased.

SUMMARY OF THE INVENTION

In view of the foregoing, it is an object of the present invention to provide an imposition apparatus capable of suppressing a printing error, and an imposition program storage medium storing an imposition program, which causes a computer to operate as the imposition apparatus when the imposition program is incorporated into the computer and executed.

To achieve the above-mentioned object, the present invention provides a first imposition apparatus comprising:

a paper image creating section that creates a paper image in such a manner that an imposition for at least one page frame is applied onto a paper, and a page including an image and/or a character is disposed in the page frame on a layout in which an imaginary page frame including the page frame is set up, so that a whole of the paper, in which the page is disposed, is provided in form of an image;

an output processing section that causes an image output machine for outputting an image on the paper to output the paper image on the paper by applying the paper image created in the paper image creating section to the image output machine; and a processing interruption section that interrupts a series of processing of creating the paper image and outputting the created paper image to the paper, which are executed by the paper image creating section and the output processing section, respectively, in the event that the page disposed on the layout juts out the imaginary page frame.

According to the first imposition apparatus of the present invention, there is used a layout in which an imaginary page frame including the page frame is set up, and a processing interruption section interrupts a series of processing of creating the paper image and outputting the created paper image to the paper, in the event that the page disposed on the layout juts out the imaginary page frame. For example, setting up of a frame of a size having somewhat margin on a predetermined page size as the imaginary page frame makes it possible to suppress the printing error, since the printing processing is interrupted in the event that an apparently erroneous larger size of page is entered.

In the first imposition apparatus according to the present invention as mentioned above, it is preferable that the imaginary page frame includes a predetermined width of margin surrounding a periphery of the page frame.

In order to absorb an error caused by a discrepancy of paper when the paper is cut, usually, there is provided a margin out of the page frame. Such a set up that the imaginary page frame includes a predetermined width of margin makes it possible to perform the processing without erroneous recognition such that a page having the margin is an erroneous size of page.

To achieve the above-mentioned object, the present invention provides a second imposition apparatus in which a page including an image and/or a character is disposed in a page frame on a layout wherein an imposition for at least one page frame is applied onto a paper, the imposition apparatus comprising:

a page size adjusting section that performs a size adjustment to coincide the page disposed on the layout with an imaginary page frame which is larger than the page frame on the layout; and a paper image creating section that creates a paper image in such a manner that the page adjusted in size in the page size adjusting section is disposed in the page frame on the layout, so that a whole of the paper, in which the page is disposed, is provided in form of an image.

Here, it is acceptable that the "size adjustment" is an adjustment in which both the length and breadth of the page coincide with the imaginary page frame, or alternatively the page coincides with the length or the breadth of the imaginary page frame maintaining a ratio of the length and the breadth of the original page.

According to the second imposition apparatus of the present invention, the page size adjusting section performs a size adjustment to coincide the page disposed on the layout with an imaginary page frame which is larger than the page frame on the layout, and the page adjusted in size in the page size adjusting section is disposed in the page frame on the layout. For example, setting up of a frame of a size having somewhat margin on a predetermined page size as the imaginary page frame makes it possible to suppress the printing error, since the paper image, in which the page after the size adjustment is disposed, is created even if an apparently erroneous size of page is entered.

In the second imposition apparatus according to the present invention as mentioned above, it is preferable that the imaginary page frame includes a predetermined width of margin surrounding a periphery of the page frame.

In order to absorb an error caused by a discrepancy of paper when the paper is cut, usually, there is provided a margin out of the page frame. Such a set up that the imaginary page frame includes a predetermined width of margin makes it possible to create a preferable paper image having the margin, in which the page is adjusted to the size including the margin even if the page smaller that the page frame is entered.

To achieve the above-mentioned object, the present invention provides a first imposition program storage medium storing an imposition program, the imposition program comprising:

a paper image creating section that creates a paper image in such a manner that an imposition for at least one page frame is applied onto a paper, and a page including an image and/or a character is disposed in the page frame on a layout in which an imaginary page frame including the page frame is set up, so that a whole of the paper, in which the page is disposed, is provided in form of an image;

an output processing section that causes an image output machine for outputting an image on the paper to output the paper image on the paper by applying the paper image created in the paper image creating section to the image output machine; and a processing interruption section for interrupting a series of processing of creating the paper image and outputting the created paper image to the paper, which are executed by the paper image creating section and the output processing section, respectively, in the event that the page disposed on the layout juts out the imaginary page frame.

When the imposition program stored in the first imposition program storage medium is executed in the computer, it is possible to cause the computer to operate as the first imposition apparatus.

To achieve the above-mentioned object, the present invention provides a second imposition program storage medium storing an imposition program which causes a computer to operate as an imposition apparatus, when the imposition program is incorporated into the computer, said imposition apparatus comprising:

a page size adjusting section that performs a size adjustment to coincide the page disposed on the layout with an imaginary page frame which is larger than the page frame on the layout; and a paper image creating section that creates a paper image in such a manner that the page adjusted in size in the page size adjusting section is disposed in the page frame on the layout, so that a whole of the paper, in which the page is disposed, is provided in form of an image.

When the imposition program stored in the second imposition program storage medium is executed in the computer, it is possible to cause the computer to operate as the second imposition apparatus.

DETAILED DESCRIPTION OF PREFERRED EMBODIMENTS

Embodiments of the present invention will be described with reference to the accompanying drawings.

Figure 1:
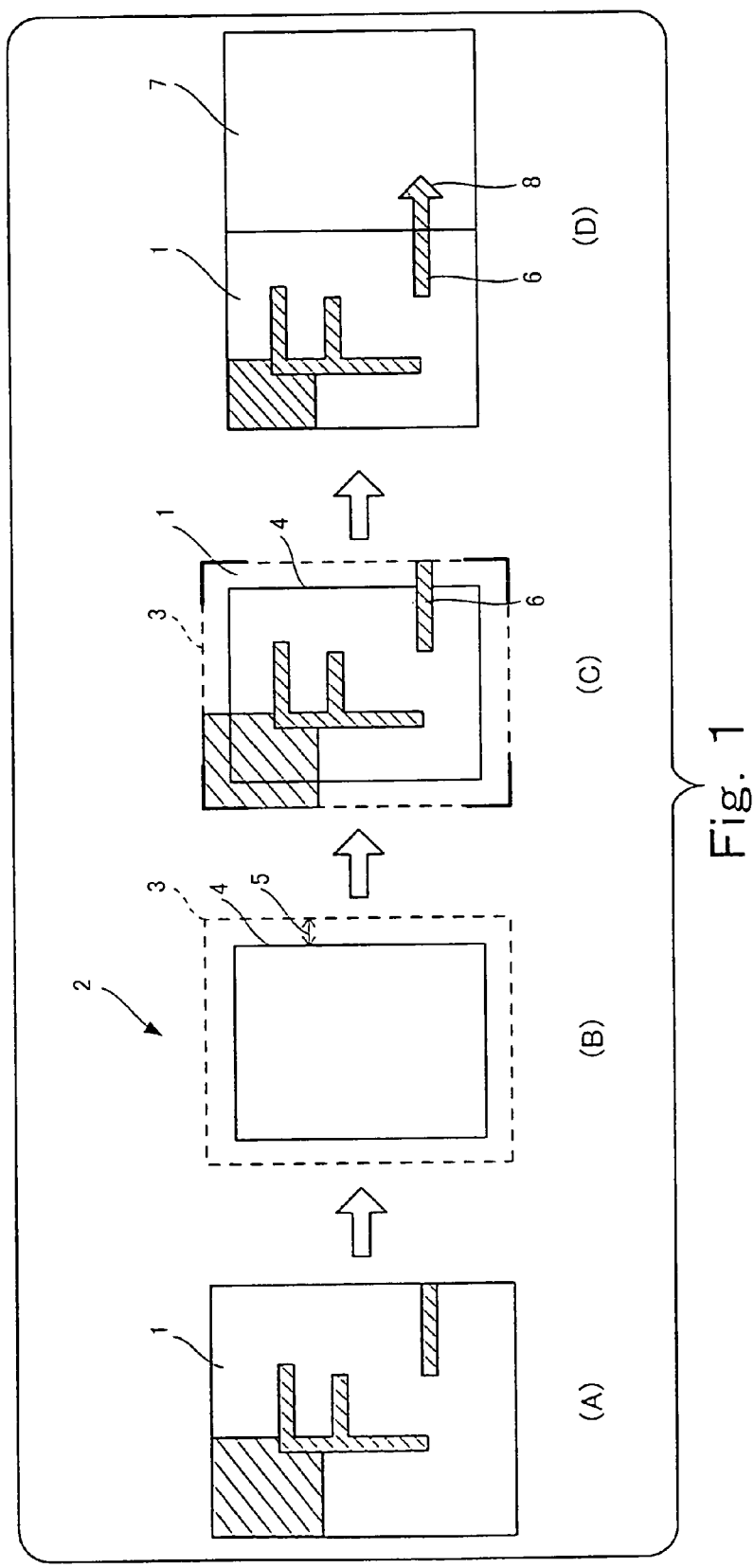
FIG. 1 is an explanatory view useful for understanding a series of processing that arranging pages edited by an operator are disposed in an imposition layout, printed, and bound.
Figure 2:
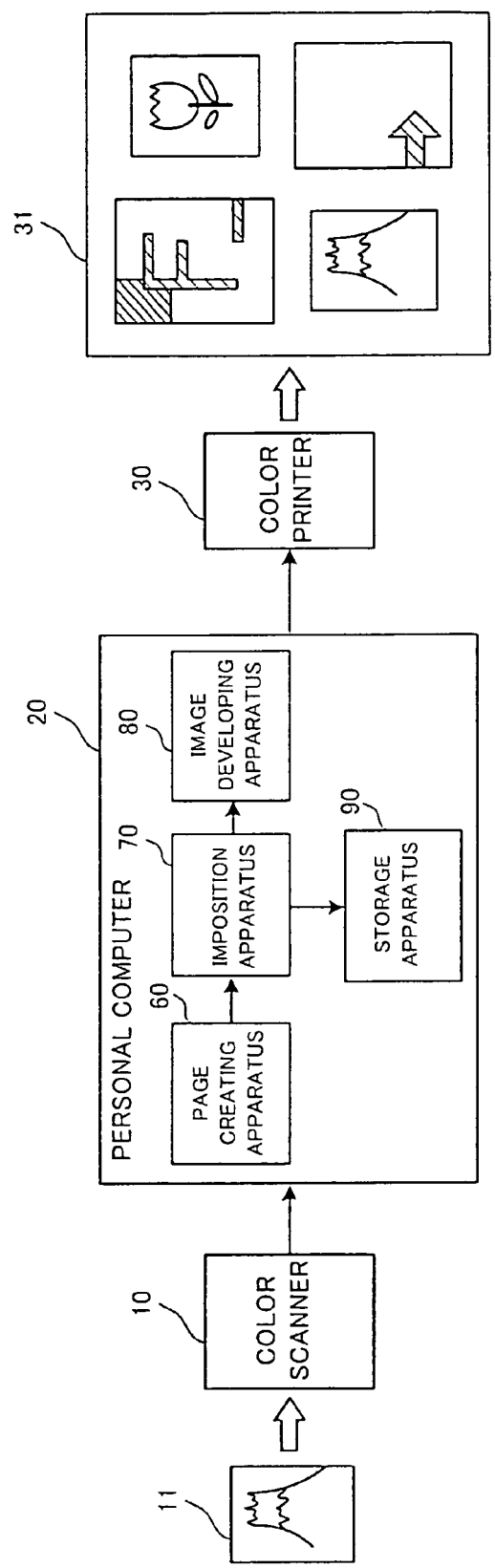
FIG. 2 is a conceptual structural view of an image processing system to which an embodiment of the present invention is applied.

FIG. 2 is a conceptual structural view of an image processing system to which an embodiment of the present invention is applied. The image processing system comprises a color scanner 10, a personal computer 20, and a color printer 30.

The color scanner 10 reads an original image 11 to create image data representative of the original image 11. The image data is fed to the personal computer 20.

The personal computer 20 creates a paper image representative of the whole of a paper wherein pages, which are edited in accordance with the original image 11 read by the color scanner 10, are arranged on the paper, and image data representative of the paper image is developed into image data for an image output suitable to the color printer 30. The personal computer 20 is provided with functions as a page creating apparatus 60, an imposition apparatus 70 as an embodiment of the present invention, an image developing apparatus 80, and a storage apparatus 90. When an operator edits the original image 11 and characters using the keyboard and mouse, the image and the characters after editing are transmitted to the page creating apparatus 60. The page creating apparatus 60 creates pages including the image and the characters edited by an operator. The imposition apparatus 70 receives the pages from the page creating apparatus 60, and creates a paper image representative of the whole of the paper wherein an imposition for at least one page is applied on a paper. The paper image thus created is transmitted to the storage apparatus 90 and is stored therein. According to the present embodiment, paper image data representative of the paper image created by the imposition apparatus 70 is described in page description data and is not capable of being outputted by the color printer 30. The imposition apparatus 70 transmits the paper image data to the image developing apparatus 80. The image developing apparatus 80 develops the paper image data described in the page description data into a bit map type of image data capable of being outputted by the color printer 30 and then transmits the same to the color printer 30.

The color printer 30 outputs onto the paper the paper image data transmitted from the image developing apparatus 80 and creates a paper image 31. Hitherto, when there is created a paper image for bookbinding in which a plurality of pages is arranged on a sheet of large paper, a printing machine is used generally. However, a series of works for printing wherein a machine plate is created, ink is applied to the machine plate, and a printing is carried out on a paper, is a large-scale work. Accordingly, when a small number of printed matters such as an on-demand publishing is created, a color printer, which is simpler than the printing machine, is used to create a paper image. The color printer 30 corresponds to an example of the image output machine referred to in the present invention.

Here, there will be explained a hardware of the personal computer 20.

Figure 3:
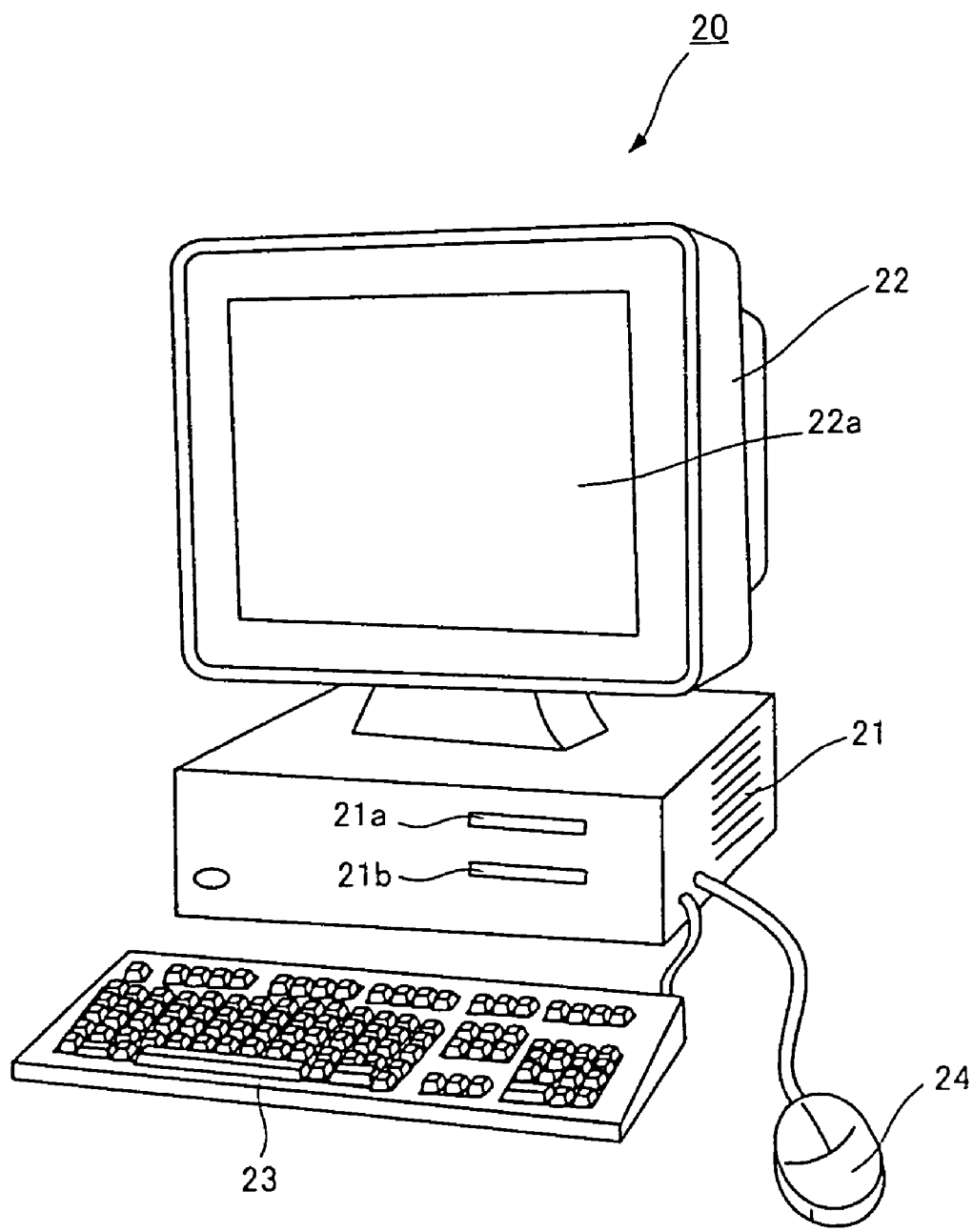
FIG. 3 is a perspective view of a personal computer.

FIG. 3 is a perspective view of the personal computer 20.

The personal computer 20 comprises, on an external appearance, a main frame unit 21, an image display unit 22 for displaying an image on a display screen 22a in accordance with an instruction from the main frame unit 21, a keyboard 23 for inputting various sorts of information to the main frame unit 21 in accordance with a key operation, and a mouse 24 for inputting an instruction according to, for example, an icon and the like, through designation of an optional position on the display screen 22a, the icon and the like being displayed on the position on the display screen 22a. The main frame unit 301 has a flexible disk (FD) mounting slot 21a for mounting a flexible disk (FD), and a CD-ROM mounting slot 21b for mounting a CD-ROM.

Figure 4:
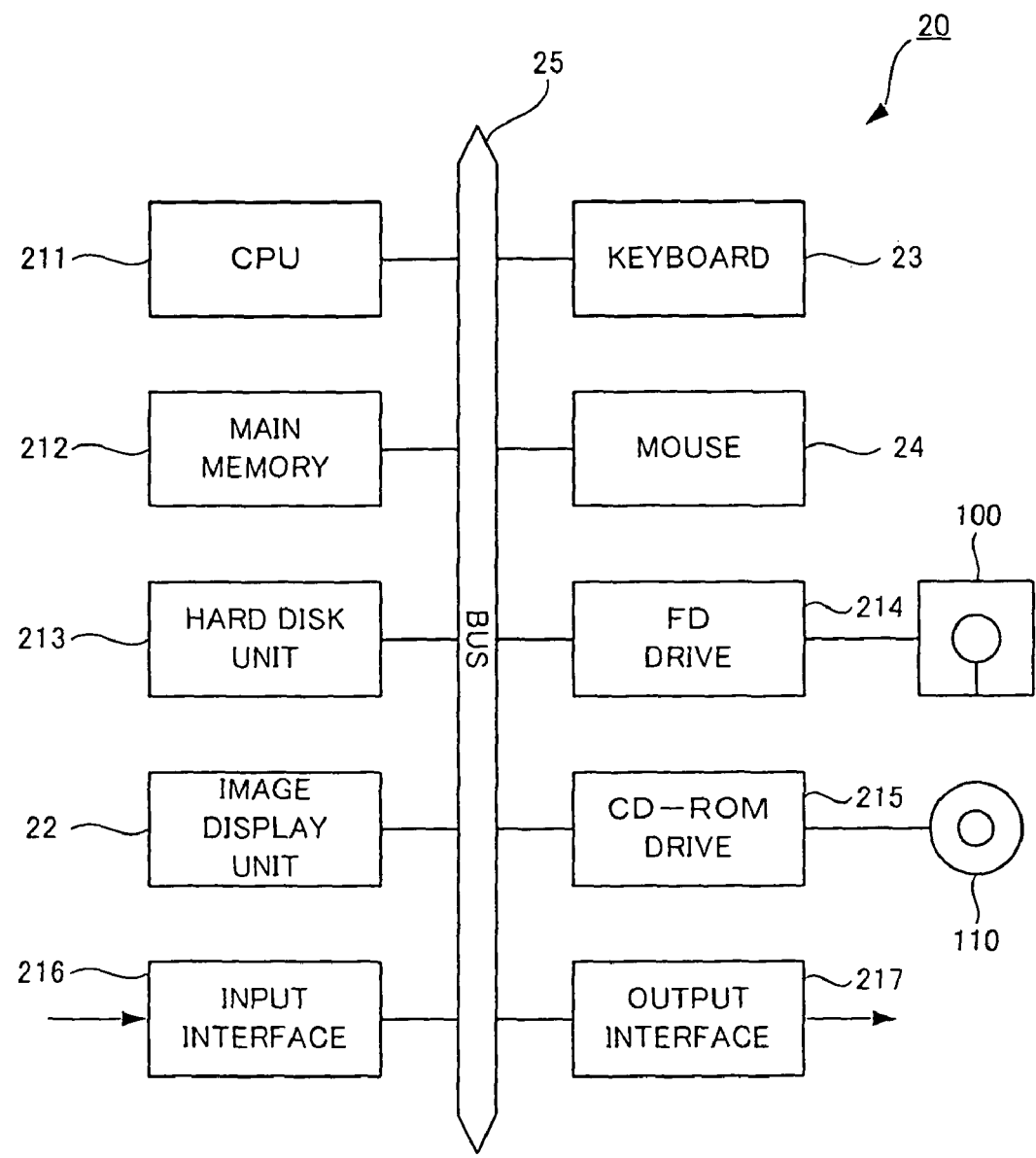
FIG. 4 is a hardware structural view of the personal computer.

FIG. 4 is a hardware structural view of the personal computer 20.

The main frame unit 21 comprises, as shown in FIG. 4, a CPU 211 for executing a various types of program, a main memory 212 in which a program stored in a hard disk unit 213 is read out and developed for execution by the CPU 211, the hard disk unit 213 for saving various types of programs and data, an FD drive 214 for accessing a flexible disk 100 mounted thereon, a CD-ROM drive 215 for accessing a CD-ROM 110 mounted thereon, an input interface 216 for receiving image data from the color scanner 10 in FIG. 2, and an output interface 217 for outputting image data to an external device such as the color printer 30 in FIG. 2. These various types of elements are connected via a bus 25 to the image display unit 22, the keyboard 23 and the mouse 24.

The CD-ROM 110 stores therein an imposition program according to an embodiment of the present invention. The CD-ROM 110 is mounted on the CD-ROM drive 215 so that the imposition program, which is stored in the CD-ROM 110, is up-loaded on the personal computer 20 and is stored in the hard disk unit 213. Thus, the personal computer 20 serves as the imposition apparatus according to the present embodiment.

Next, there will be described an imposition program for creating the imposition apparatus 70 shown in FIG. 2, which is an embodiment of the present invention.

Figure 5:
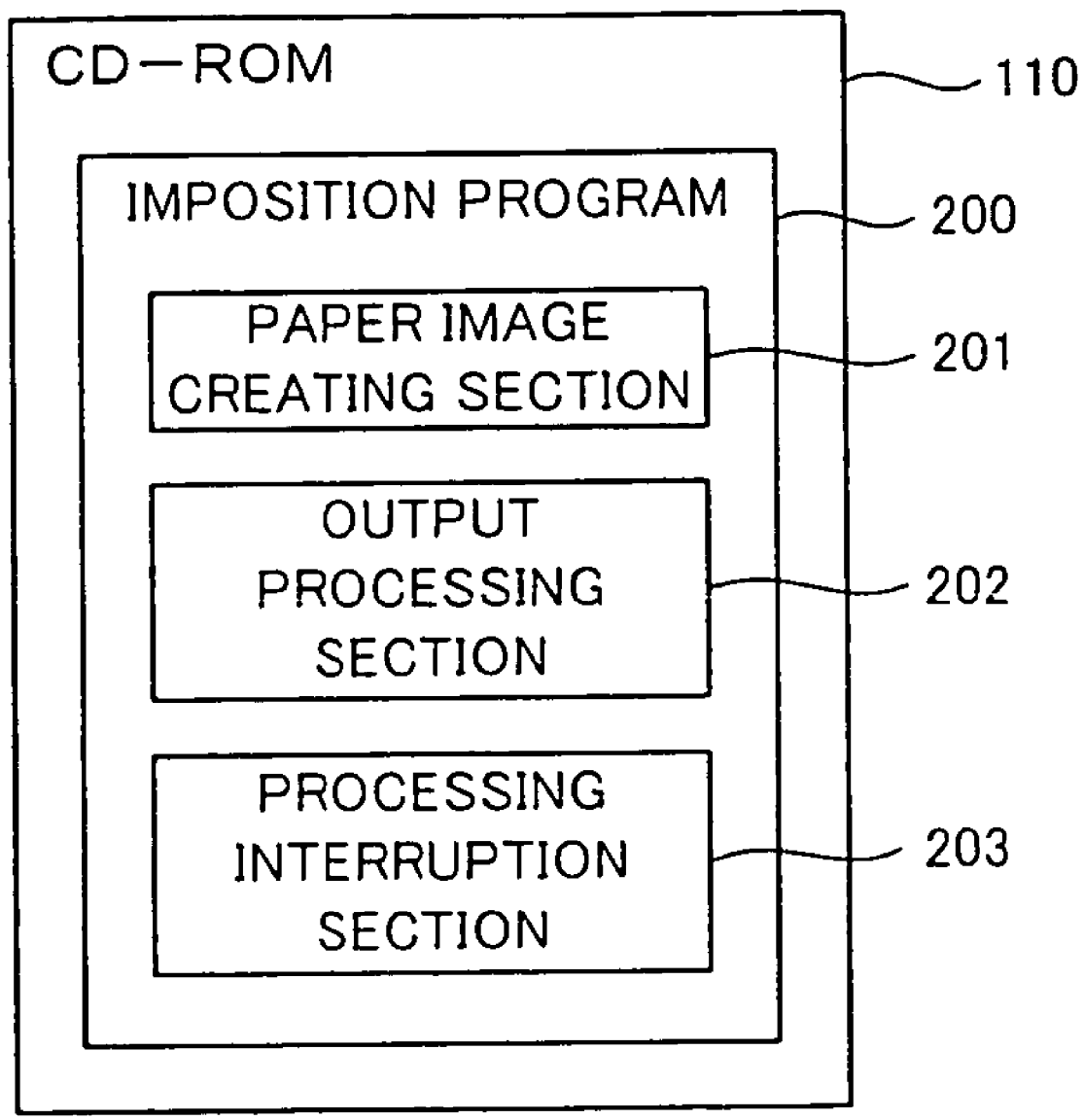
FIG. 5 is a conceptual view showing a CD-ROM storing an imposition program stored in an imposition program storage medium according to an embodiment of the present invention.

FIG. 5 is a conceptual view showing the CD-ROM 110 storing an imposition program stored in an imposition program storage medium according to an embodiment of the present invention.

An imposition program 200 stored in the CD-ROM 110 comprises a paper image creating section 201, an output processing section 202, and a processing interruption section 203. The paper image creating section 201 corresponds to the example of the paper image creating section in the imposition program stored in the imposition program storage medium of the present invention. The output processing section 202 corresponds to the example of the output processing section in the imposition program stored in the imposition program storage medium of the present invention. The processing interruption section 203 corresponds to the example of the processing interruption section in the imposition program stored in the imposition program storage medium of the present invention. The details of the respective sections of the imposition program 200 will be explained in conjunction with the functions of the respective sections of the imposition apparatus 70 shown in FIG. 6, which is an embodiment of the imposition apparatus of the present invention.

Figure 6:
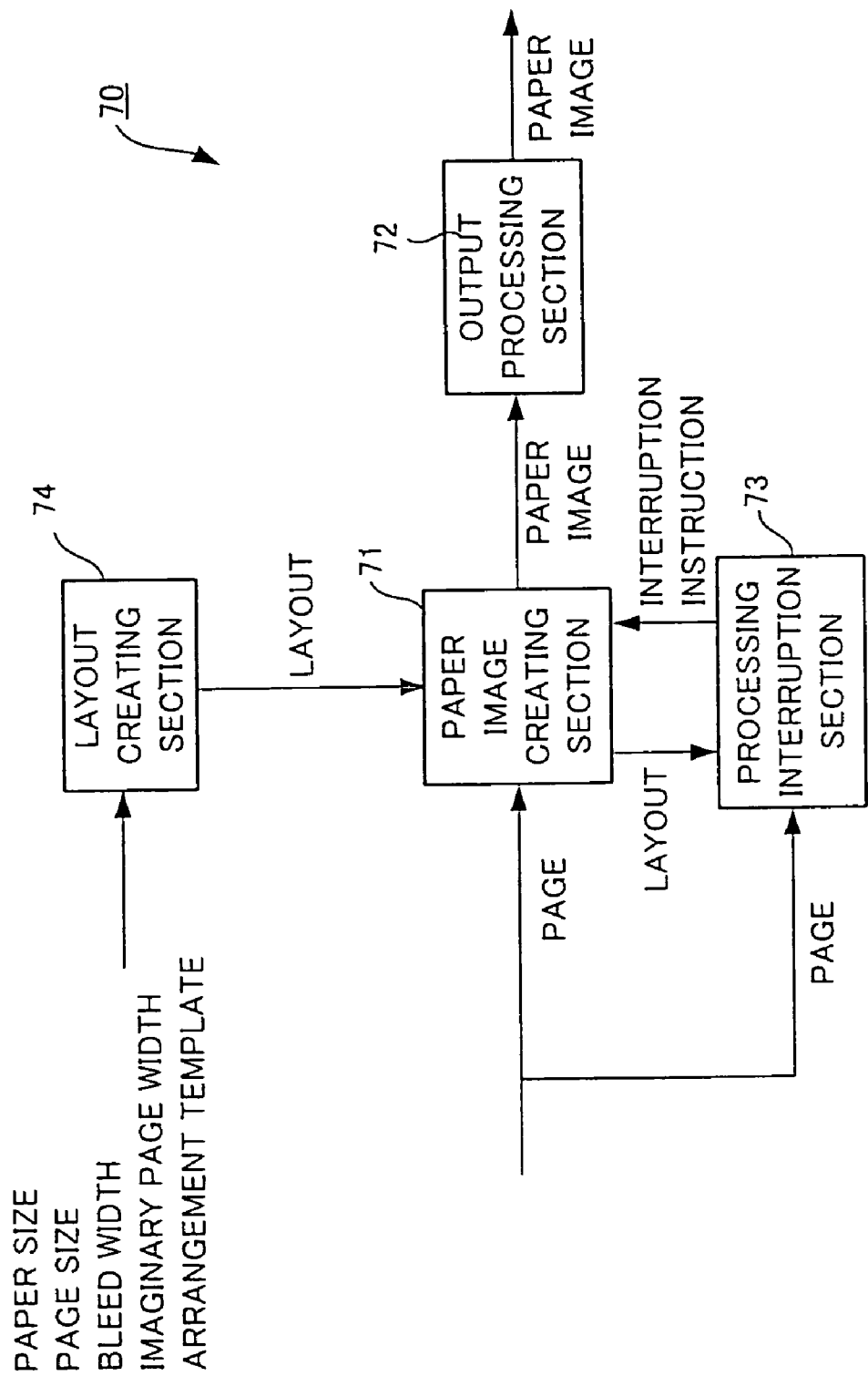
FIG. 6 is a functional block diagram of an imposition apparatus.

FIG. 6 is a functional block diagram of the imposition apparatus 70, in which the imposition program 200 is installed in the personal computer 20 shown in FIG. 2 so that the personal computer 20 serves as an imposition apparatus according to an embodiment of the present invention.

The imposition apparatus 70, which is shown also in the FIG. 2, comprises a paper image creating section 71, an output processing section 72, a processing interruption section 73, and a layout creating section 74. When the imposition program 200 shown in FIG. 5 is installed in the personal computer 20 shown in FIG. 2 to FIG. 4, the paper image creating section 201 of the imposition program 200 constitutes the paper image creating section 71 in FIG. 6. Likely, the output processing section 202 constitutes the output processing section 72, and the processing interruption section 203 constitutes the processing interruption section 73.

When an operator uses the keyboard 23 and the mouse 24 in FIG. 3 to designate a paper size indicative of a size of a paper, a page size indicative of a size of a page, a bleed width indicative of a width of a margin, an imaginary page width indicative of a width of an imaginary page tab larger than the margin, and an arrangement template indicative of the number of pages to be arranged on a paper and positions in which pages are arranged, those values are transmitted to the layout creating section 74. The layout creating section 74 creates a layout in which there are set up a bleed frame wherein an imposition is applied in accordance with an arrangement template where a page frame of a page size designated on a paper of the designated paper size is designated, and the page frame is encircled by the designated bleed width, and an imaginary page frame encircling the page frame by an imaginary page width. The layout thus created is transmitted to the paper image creating section 71.

The paper image creating section 71 receives the layout from the layout creating section 74. The paper image creating section 71 receives further the pages from the page creating apparatus 60 shown in FIG. 2 to create a paper image representative of the whole of the paper where the received pages are arranged on the page frame of the layout. The paper image creating section 71 corresponds to an example of the paper image creating section in the imposition apparatus of the present invention. The paper image thus created is transmitted from the paper image creating section 71 to the output processing section 72, while the obtained layout is transmitted from the paper image creating section 71 to the processing interruption section 73.

The output processing section 72 transmits the paper image, which is transmitted from the paper image creating section 71, to the image developing apparatus 80 shown in FIG. 2, so that the image developing apparatus 80 converts a format of paper image data representative of the paper image from the page description data to the bit map data, and causes the color printer 30 to output on a paper a halftone dot of paper image represented by the bit map data. The paper image thus obtained is also transmitted from the output processing section 72 to the storage apparatus 90 shown in FIG. 2 so as to be stored therein. The output processing section 72 corresponds to an example of the output processing section in the imposition apparatus of the present invention.

The processing interruption section 73 receives the layout from the paper image creating section 71 and receives pages from the page creating apparatus 60 shown in FIG. 2. When the size of the received page is larger than the size of the imaginary page frame set up on the layout, the processing interruption section 73 transmits to the paper image creating section 71 an interruption instruction to interrupt the processing for creating the paper image. The processing interruption section 73 corresponds to an example of the processing interruption section in the imposition apparatus of the present invention.

The basic structure of the imposition apparatus 70 is as mentioned above.

Figure 7:
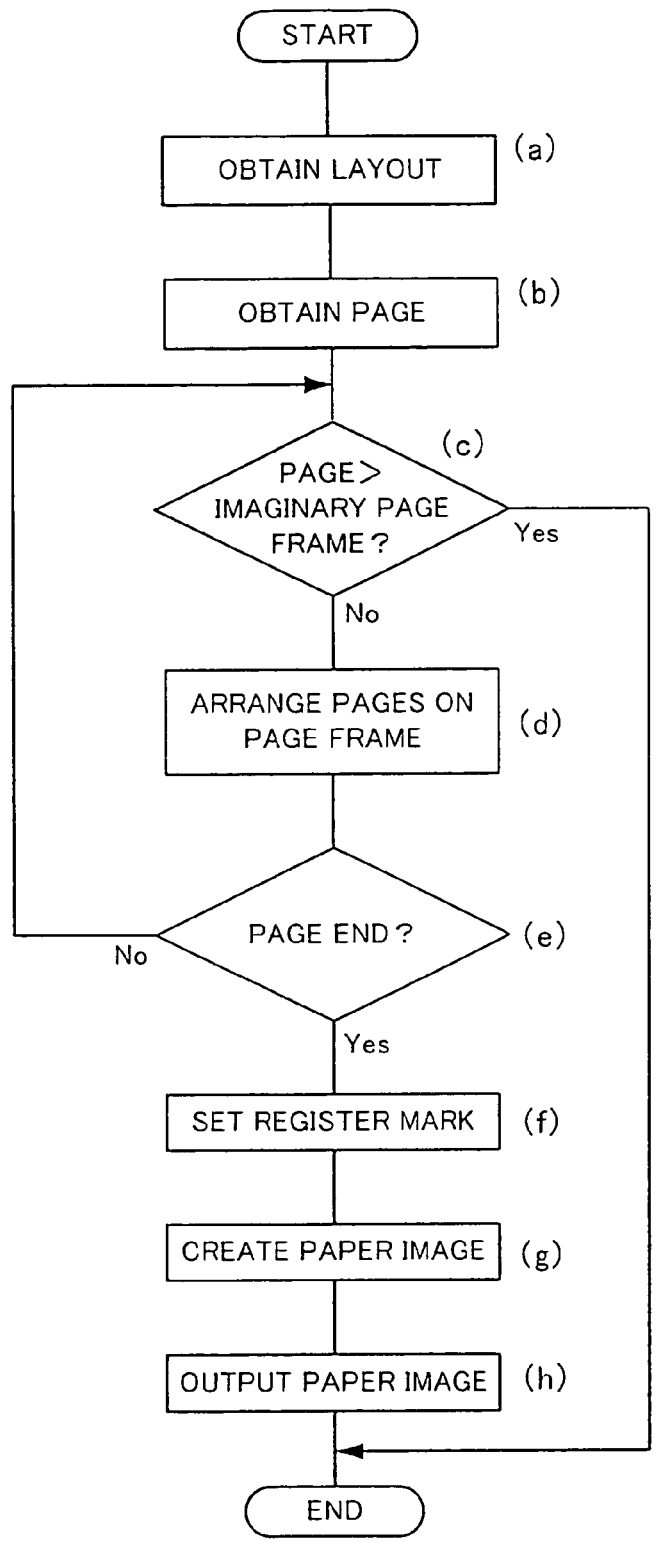
FIG. 7 is a flowchart useful for understanding a series of processing in which arranging pages are disposed on a layout to create a paper image, and the paper image is outputted on a paper.

FIG. 7 is a flowchart useful for understanding a series of processing in which arranging pages are disposed on a layout to create a paper image, and the paper image is outputted on a paper. Hereinafter, there will be explained such a series of processing that pages transmitted from the page creating apparatus 60 shown in FIG. 2 are arranged on a paper using the imposition apparatus 70, and the paper image is outputted from the color printer 30 shown in FIG. 2.

First, when an operator clicks an icon (not illustrated) prepared beforehand using the mouse 24 shown in FIG. 3, a set up screen prepared beforehand is displayed on the display screen 22a shown in FIG. 3.

Figure 8:
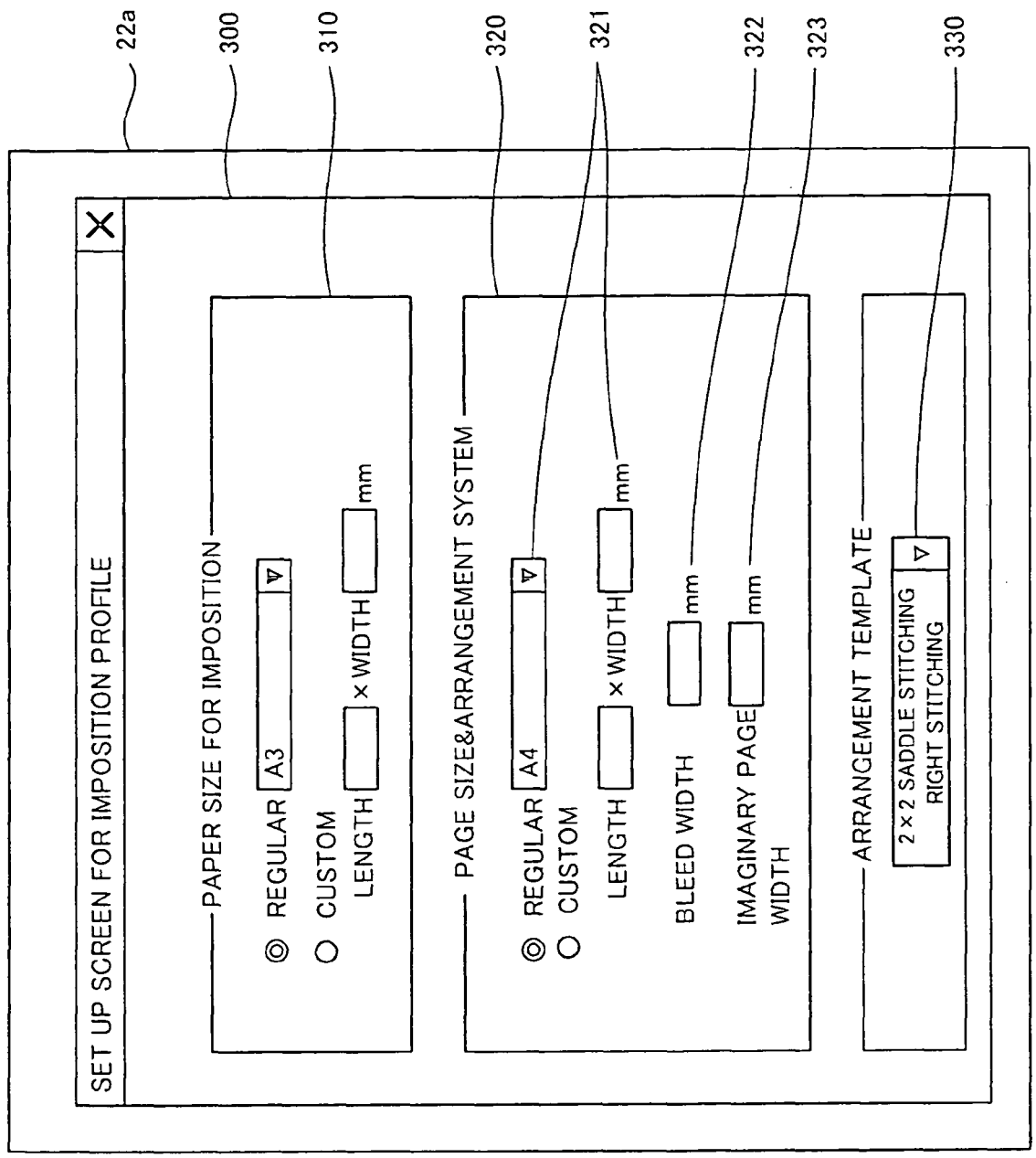
FIG. 8 is a view showing a setting up screen displayed on a display screen.

FIG. 8 is a view showing a set up screen 300 displayed on the display screen 22a. The set up screen 300 is provided with a paper size set up section 310 for setting up a paper size, a page set up section 320 for setting up set up values related to pages, and an arrangement template set up section 330 for setting up an arrangement template for determining the number of pages to be arranged on a paper and arrangement positions for pages. The page set up section 320 comprises: a page size set up section 321 for setting up a page size; a bleed width set up section 322 for setting up a width of a margin; and an imaginary page width set up section 323 for setting up a width of an imaginary page tab which is larger than the margin. An operator designates the paper size, the page size, the bleed width, the imaginary page width, and the arrangement template, using the set up screen 300.

The respective values designated by an operator are transmitted to the layout creating section 74 shown in FIG. 6. The layout creating section 74 creates a layout according to those values and transmits the created layout to the paper image creating section 71 (step (a) in FIG. 7).

Figure 9:
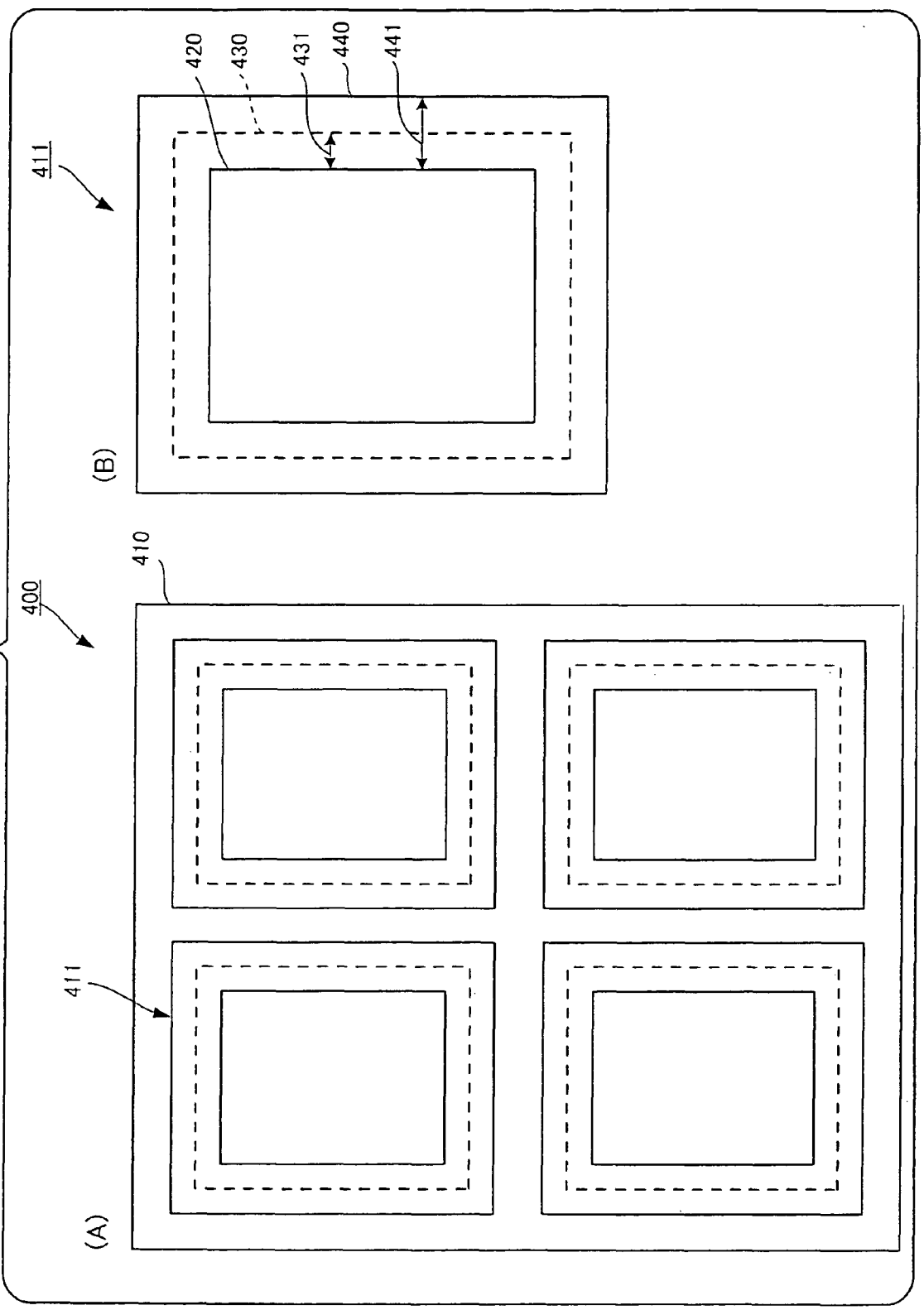
FIG. 9 is an explanatory view useful for understanding a layout received by a paper image creating section.

FIG. 9 is an explanatory view useful for understanding the layout received by the paper image creating section 71. In a layout 400 shown in a part (A) of FIG. 9, there is set up a paper frame 410 of the paper size designated by an operator. The paper frame 410 is divided into four page areas 411. A part (B) of FIG. 9 shows one page area 411 of four page areas 411 shown in the part (A) of FIG. 9. In the page area 411, there are set up a page frame 420 of the page size designated by an operator, a bleed frame 430 including the page frame 420 with a designated bleed width 431, and an imaginary page frame 440 including the page frame 420 with a designated imaginary width 441. The page frame 420 corresponds to an example of the page frame referred to in the present invention. Likely, the margin located between the bleed frame 430 and the page frame 420 corresponds to an example of the margin referred to in the present invention. The imaginary page frame 440 corresponds to an example of the imaginary page frame referred to in the present invention. The layout 400 corresponds to an example of the layout referred to in the present invention.

The paper image creating section 71 transmits the received layout to the processing interruption section 73. The paper image creating section 71 and the processing interruption section 73 receive pages from the page creating apparatus 60 (a step (b) in FIG. 7).

Figure 10:
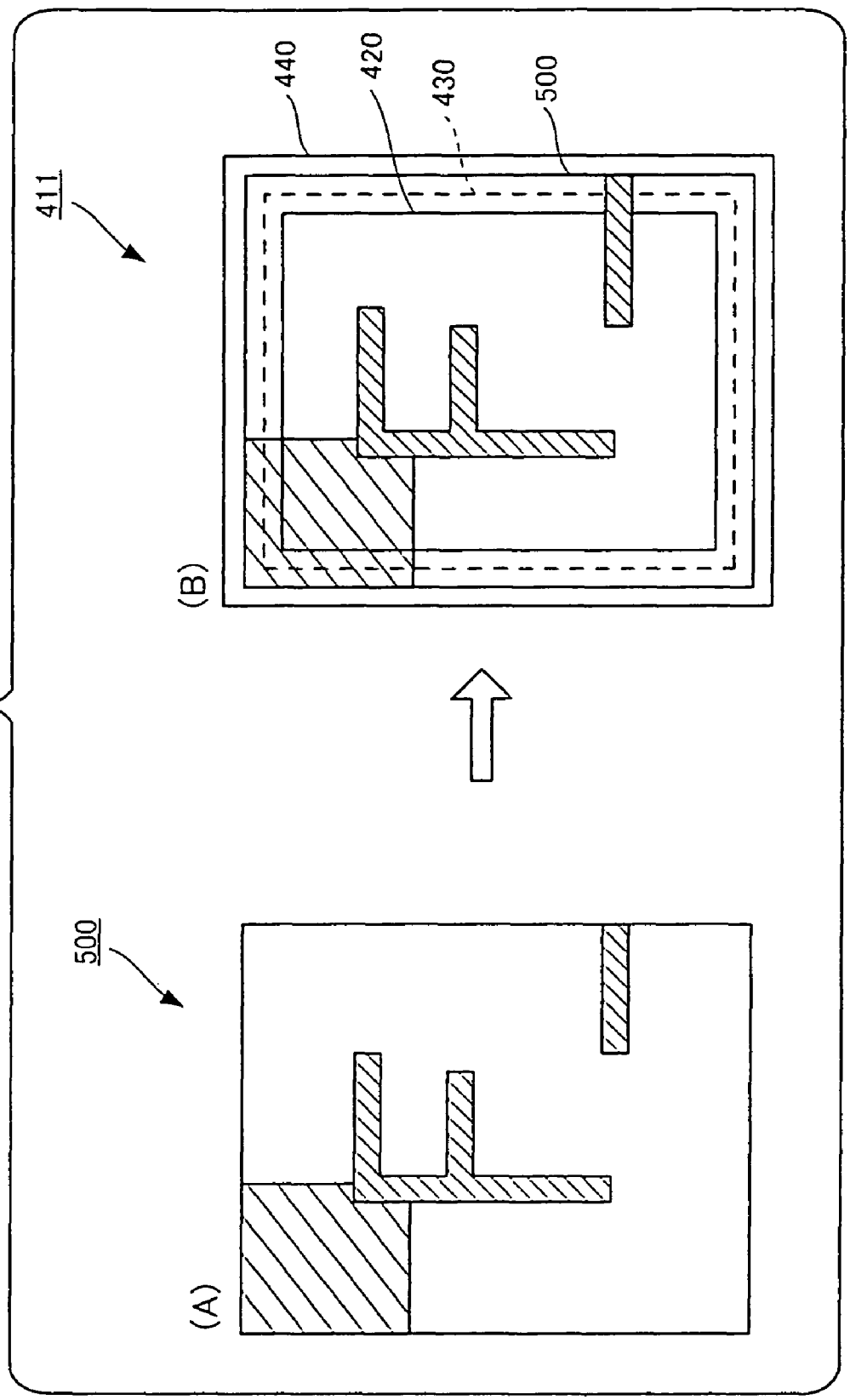
FIG. 10 is a view showing a page received by a paper image creating section and a processing interruption section, and a page area in which the page is disposed on the layout shown in FIG. 9.

FIG. 10 is a view showing a page received by a paper image creating section and a processing interruption section, and a page area in which the page is disposed on the layout shown in FIG. 9. A part (A) of FIG. 10 shows a page 500, which the paper image creating section 71 and the processing interruption section 73 receive. A part (B) of FIG. 10 shows the page area 411 wherein the page 500 is disposed on the page area 411 on the layout 400 shown in FIG. 9. According to the present embodiment, the page 500 juts out from the page frame 420 and the bleed frame 430 of the page area 411, but does not jut out from the imaginary page frame 440. Thus, the process in the flowchart of FIG. 7 advances from the step (c) to the step (d).

The paper image creating section 71 arranges the page 500 transmitted from the page creating apparatus 60 of FIG. 2 on the page areas 411 on the layout 400 of FIG. 9 with the arrangement as shown in the part (B) of FIG. 10 (a step (d) of FIG. 7).

Processing of the step (c) and the step (d) of FIG. 7 is carried out in connection with all the pages transmitted from the page creating apparatus 60 in FIG. 2 to the paper image creating section 71. When an arrangement for all the pages is completed in a step (e) of FIG. 7, the process goes to a step (f) of FIG. 7.

In the step (f) of FIG. 7, the paper image creating section 71 sets up a register mark, which is a mark when the paper is cut, on the layout in which pages are arranged.

In the step (g) of FIG. 7, the paper image creating section 71 creates a paper image representative of the whole of the paper frame on the layout in which pages are arranged.

Figure 11:
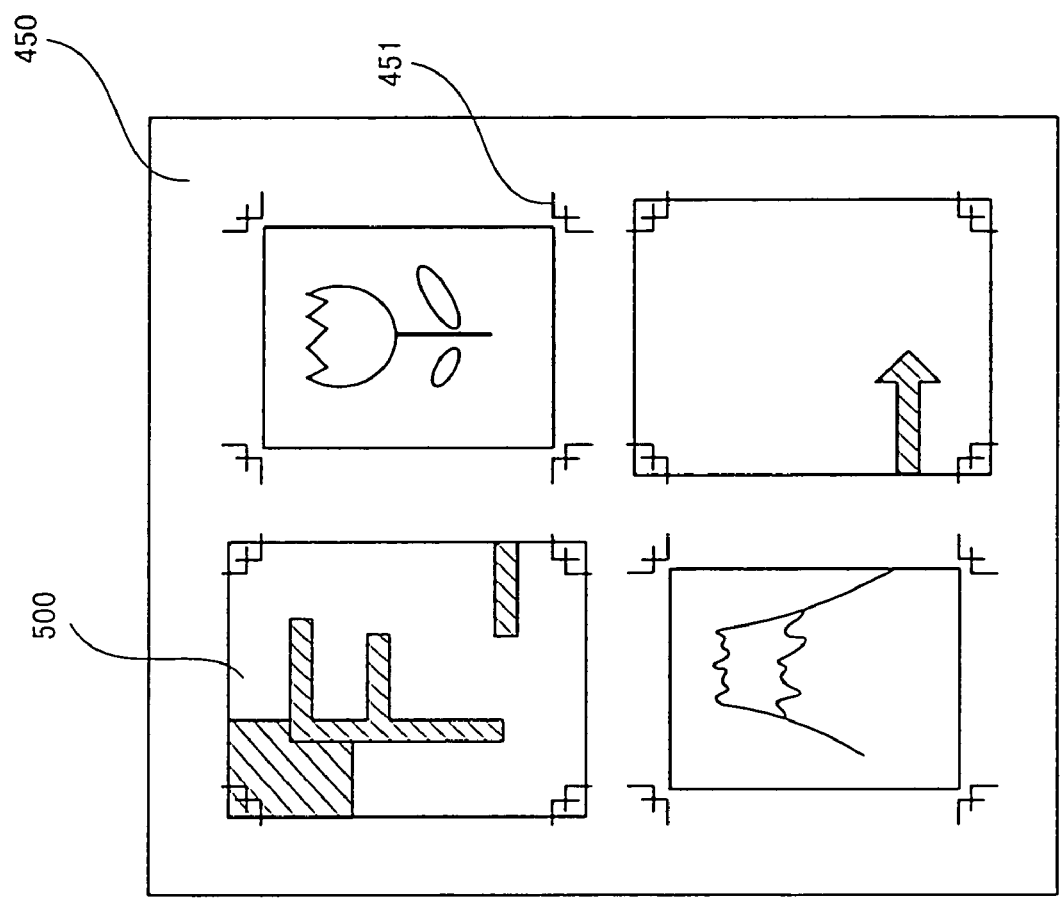
FIG. 11 is a view showing a paper image created in a paper image creating section.

FIG. 11 is a view showing a paper image created in the paper image creating section 71. In a paper image 450, there are arranged four pages as a page 500. The paper image 450 has register marks 451. Upper left and lower right of pages are larger than the area encircled by the register marks 451. But an image portion, which juts out from the area, is cut. The paper image creating section 71 transmits the paper image 450 to the output processing section 72.

The output processing section 72 transmits the paper image, which is transmitted from the paper image creating section 71, to the image developing apparatus 80 and the storage apparatus 90 in FIG. 2.

The storage apparatus 90 in FIG. 2 stores therein the paper image transmitted from the output processing section 72. The image developing apparatus 80 receives the paper image from the output processing section 72 and develops the format of image data representative of the paper image from the page description data to the bit map data. A halftone dot of paper image represented by the developed image data is transmitted to the color printer 30 in FIG. 2 so as to be outputted on the paper (a step (h) of FIG. 7).

In the manner as mentioned above, the paper image is outputted on the paper. Here, there will be explained a case where in the step (b) of FIG. 7, a page of the page size, which is larger than the imaginary page frame on the layout, is transmitted to the paper image creating section 71.

Figure 12:
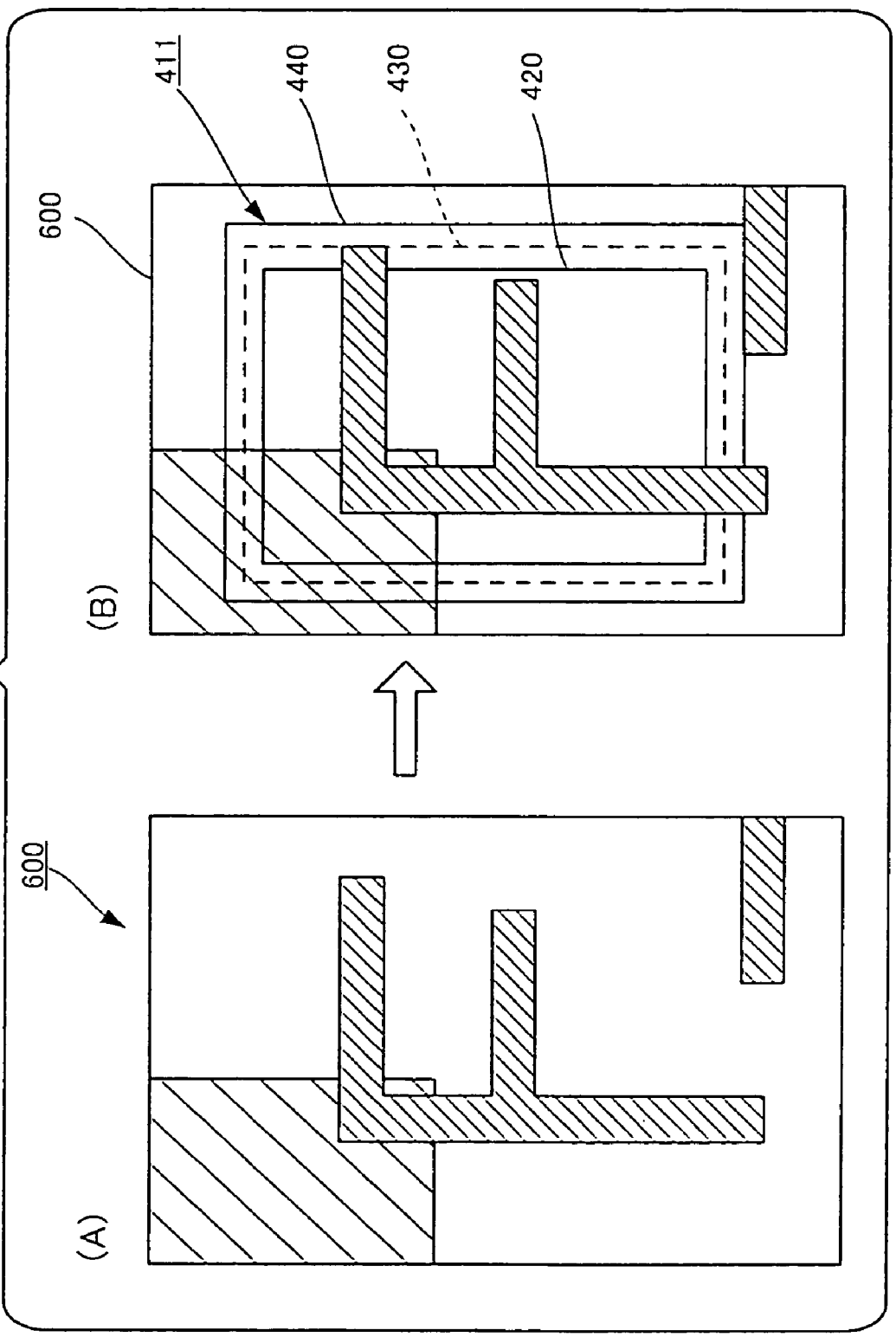
FIG. 12 is a view showing a page received by a paper image creating section and a processing interruption section, and a page area in which the page is disposed on the layout shown in FIG. 9.

FIG. 12 is a view showing a page received by a paper image creating section and a processing interruption section, and a page area in which the page is disposed on the layout shown in FIG. 9. A part (A) of FIG. 12 shows a page 600, which the paper image creating section 71 and the processing interruption section 73 receive. A part (B) of FIG. 12 shows the page area 411 wherein the page 600 is disposed on the page area 411 on the layout 400 shown in FIG. 9. According to the present embodiment, the page 600 juts out from the page frame 420, the bleed frame 430, the imaginary page frame 440 of the page area 411. And it is apparent that the page 600 is too large. Thus, the processing interruption section 73 decides that page 600 is larger than the imaginary page frame 440 on the layout 400 (the step (c) of FIG. 7), and transmits to the paper image creating section 71 an interruption instruction to interrupt the processing for creating the paper image.

When the paper image creating section 71 receives the interruption instruction from the processing interruption section 73, the paper image creating section 71 interrupts the processing and stops the creation of the paper image. In the flowchart of FIG. 7, the processing from the step (d) to the step (h) is omitted and a series of processing for creating the paper image is interrupted.

In this manner, when an apparently erroneous larger size of page is obtained, the processing for creating the paper image is interrupted, and thus it is possible to reduce the printing error.

While the above-mentioned embodiment applies a color printer as an example of the image output machine, the color printer is not restricted to a printing system. It is acceptable to adopt an electrophotographic system of color printer, an ink jet system of color printer, or a printer of a system in which a printing paper is exposed with a modulated laser light to develop the printing paper. As to the image output machine, it is not restricted to the color printer, and it is acceptable to adopt a printing machine.

Further, according to the present embodiment, while the imposition apparatus is provided with the processing interruption section for interrupting the processing of creating the paper image in the paper image creating section, it is acceptable that the processing interruption section referred to in the present invention is one for interrupting the processing of outputting the paper image created in the paper image creating section to the output processing section, or alternatively it is acceptable that the processing interruption section referred to in the present invention is one for interrupting the processing of outputting the paper image to the image output machine by the output processing section.

Furthermore, according to the present embodiment, while there is used the layout in which four page frames are arranged in the imposition on the paper, the layout used in the imposition apparatus of the present invention is not restricted to the four page frames as far as at least one page frame is concerned on the paper.

Still further, according to the present embodiment, while there is explained an imposition apparatus in which an operator designates a paper size and a page size so that a layout according to the associated values is applied, it is acceptable that the imposition apparatus of the present invention applies a predetermined layout.

Next, there will be described an imposition program for creating another imposition apparatus, which is another embodiment of the present invention.

Figure 13:
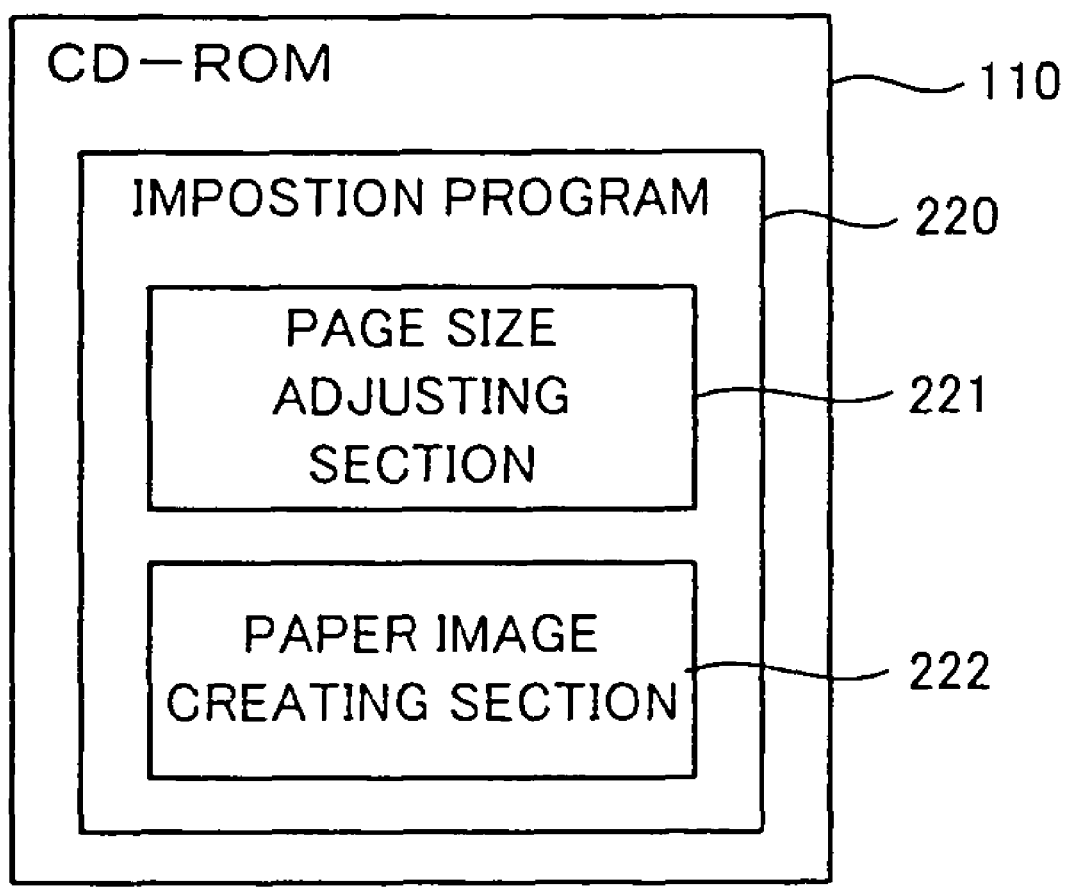
FIG. 13 is a conceptual view showing a CD-ROM storing an imposition program stored in an imposition program storage medium according to another embodiment of the present invention.

FIG. 13 is a conceptual view showing the CD-ROM 110 storing an imposition program stored in an imposition program storage medium according to another embodiment of the present invention.

An imposition program 220 stored in the CD-ROM 110 comprises a page size adjusting section 221, and a paper image creating section 222. The page size adjusting section 221 corresponds to the example of the page size adjusting section in the imposition program stored in the imposition program storage medium of the present invention. The paper image creating section 222 corresponds to the example of the paper image creating section in the imposition program stored in the imposition program storage medium of the present invention. The details of the respective sections of the imposition program 220 will be explained in conjunction with the functions of the respective sections of the imposition apparatus 170 shown in FIG. 14, which is another embodiment of the imposition apparatus of the present invention.

Figure 14:
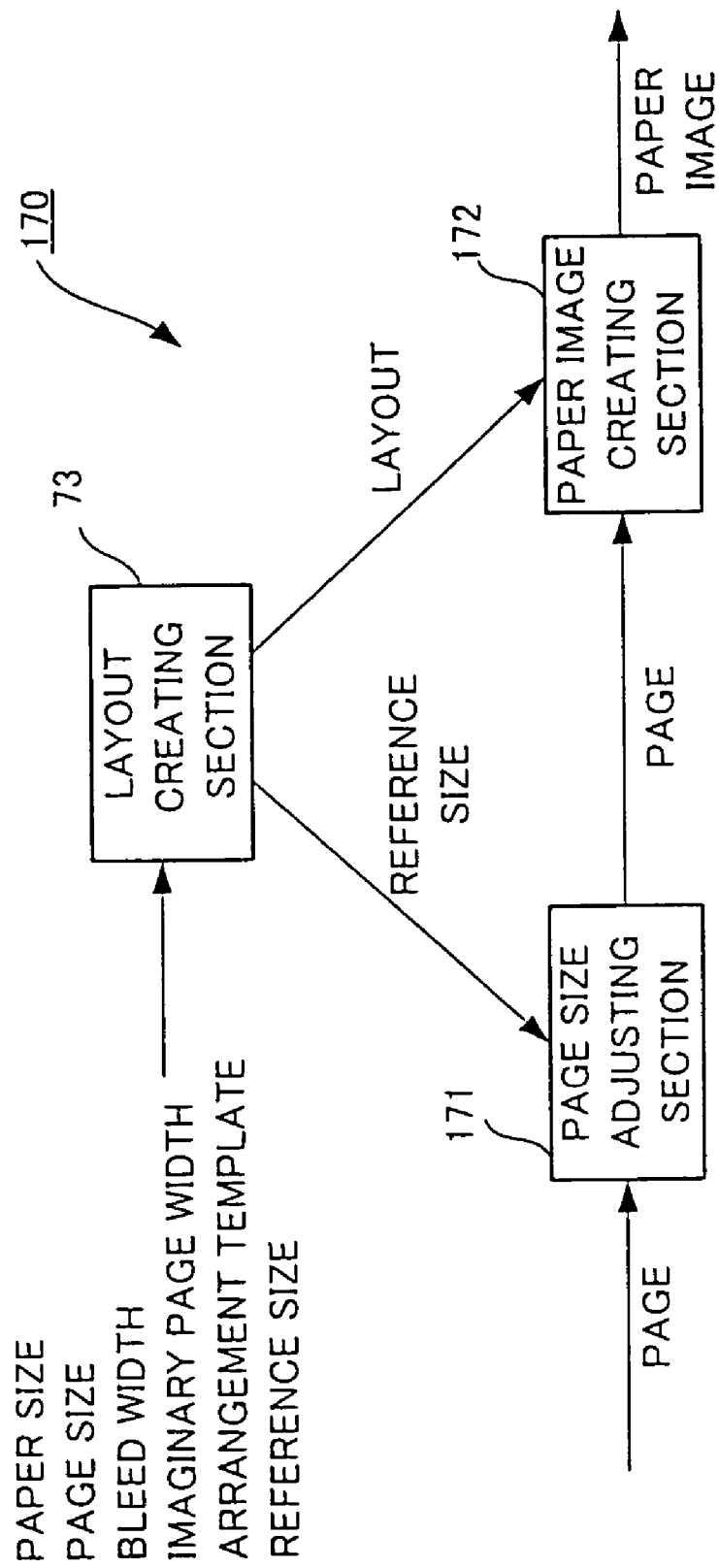
FIG. 14 is a functional block diagram of another imposition apparatus.

FIG. 14 is a functional block diagram of the imposition apparatus 170, in which the imposition program 220 is installed in the personal computer 20 shown in FIG. 2 so that the personal computer 20 serves as an imposition apparatus according to another embodiment of the present invention.

The imposition apparatus 170, which takes the place for the imposition apparatus 70 shown in the FIG. 2, comprises a page size adjusting section 171, a paper image creating section 172, and a layout creating section 173. When the imposition program 220 shown in FIG. 13 is installed in the personal computer 20 shown in FIG. 2 to FIG. 4, the page size adjusting section 221 of the imposition program 200 constitutes the page size adjusting section 171 in FIG. 14. Likely, the paper image creating section 222 of the imposition program 200 constitutes the paper image creating section 172.

When an operator uses the keyboard 23 and the mouse 24 in FIG. 3 to designate various set up values such as page sizes necessary for creating the layout in which the page frame and the like are set up, and a reference size that is a criterion when a size of pages is adjusted, those set up values are transmitted to the layout creating section 173. The layout creating section 173 creates a layout in accordance with the designated set up values, and transmits the layout thus created to the paper image creating section 172, while transmitting the designated reference size to the page size adjusting section 171.

The page size adjusting section 171 receives the reference size from the layout creating section 74, and receives the pages from the page creating apparatus 60 shown in FIG. 2. The page size adjusting section 171 adjusts a size of the obtained pages to a size to meet the reference size. The page size adjusting section 171 corresponds to an example of the page size adjusting section in the imposition apparatus of the present invention.

The paper image creating section 172 receives the layout from the layout creating section 173. The paper image creating section 172 receives further the pages from the page size adjusting section 171. The paper image creating section 172 creates a paper image representative of the whole of the paper where the received pages are arranged on the page frame of the layout. The paper image creating section 172 corresponds to an example of the paper image creating section in the imposition apparatus of the present invention. The paper image thus created is transmitted from the paper image creating section 172 to the image developing apparatus 80.

The basic structure of the imposition apparatus 70 is as mentioned above.

Figure 15:
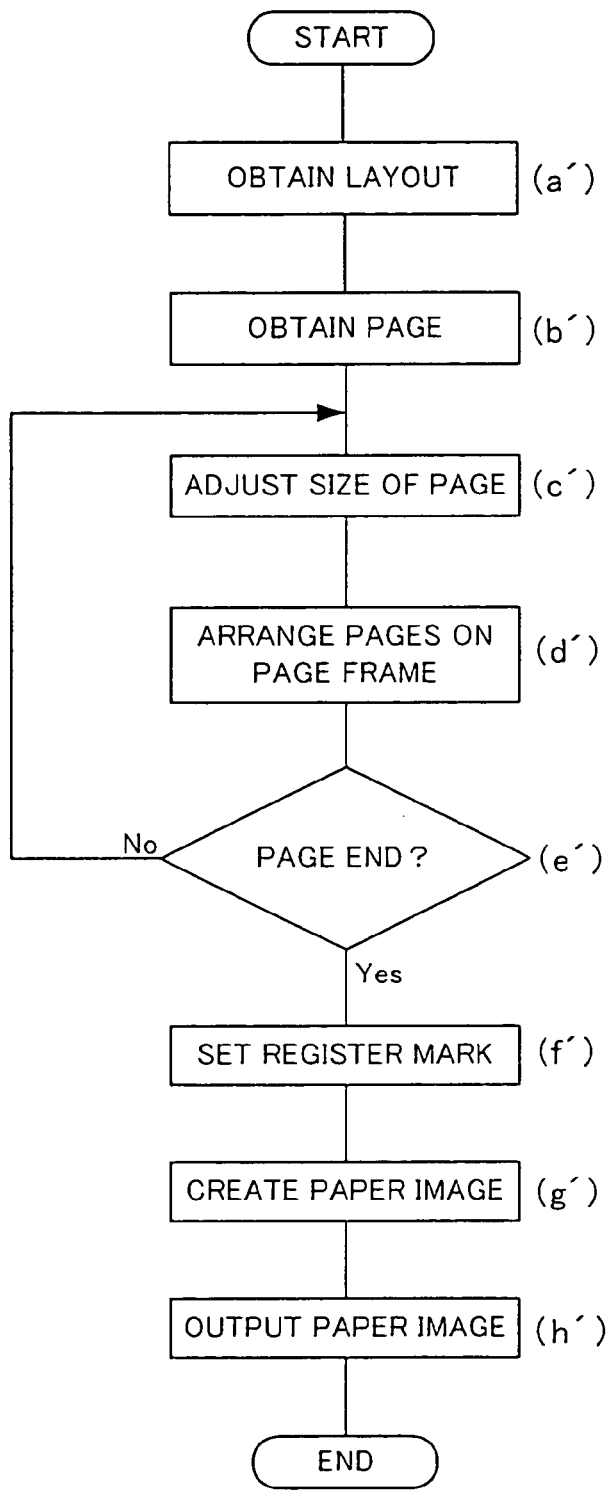
FIG. 15 is a flowchart useful for understanding a series of processing in which arranging pages are disposed on a layout to create a paper image in accordance with another embodiment of the present invention, and the paper image is outputted on a paper.

FIG. 15 is a flowchart useful for understanding a series of processing in which arranging pages are disposed on a layout to create a paper image, and the paper image is outputted on a paper. Hereinafter, there will be explained such a series of processing that pages transmitted from the page creating apparatus 60 shown in FIG. 2 are arranged on a paper using the imposition apparatus 170, and the paper image is outputted from the color printer 30 shown in FIG. 2.

First, when an operator clicks an icon (not illustrated) prepared beforehand using the mouse 24 shown in FIG. 3, a set up screen prepared beforehand is displayed on the display screen 22a shown in FIG. 3.

Figure 16:
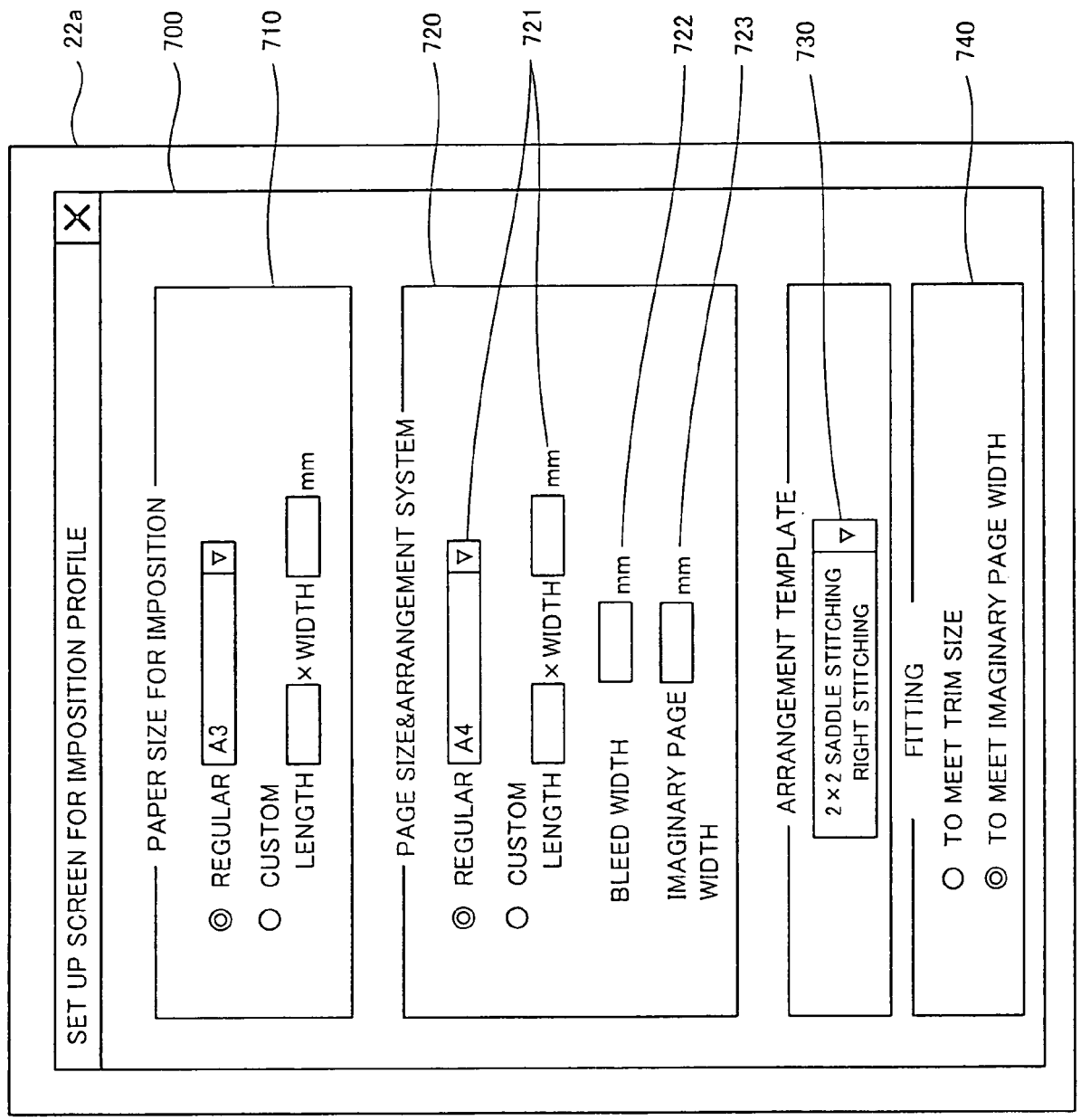
FIG. 16 is a view showing a setting up screen displayed on a display screen in accordance with another embodiment of the present invention.

FIG. 16 is a view showing a set up screen 700 displayed on the display screen 22a. The set up screen 700 is provided with a paper size set up section 710 for setting up a paper size, a page set up section 720 for setting up set up values related to pages, an arrangement template set up section 730 for setting up an arrangement template for determining the number of pages to be arranged on a paper and arrangement positions for pages, and a fitting set up section 740 for setting up set up a reference size which is a criterion when the size adjusting for pages is carried out. The page set up section 720 comprises: a page size set up section 721 for setting up a page size; a bleed width set up section 722 for setting up a width of a margin; and an imaginary page width set up section 723 for setting up a width of an imaginary page tab which is larger than the margin. According to the present embodiment, it is possible to designate, as the reference size, a size of the page frame surrounding the designated page size, or a size of the imaginary page frame in which the page frame is surrounded with the designated imaginary page width. For the sake of the convenience of the explanation, hereinafter, there will be explained the embodiment assuming that a size of the imaginary page frame is set up as the reference size. An operator designates the paper size, the page size, the bleed width, the imaginary page width, the arrangement template, and the reference size, using the set up screen 700.

The respective values designated by an operator are transmitted to the layout creating section 173 shown in FIG. 14. The layout creating section 173 creates a layout according to those values (step (a') in FIG. 15).

Figure 17:
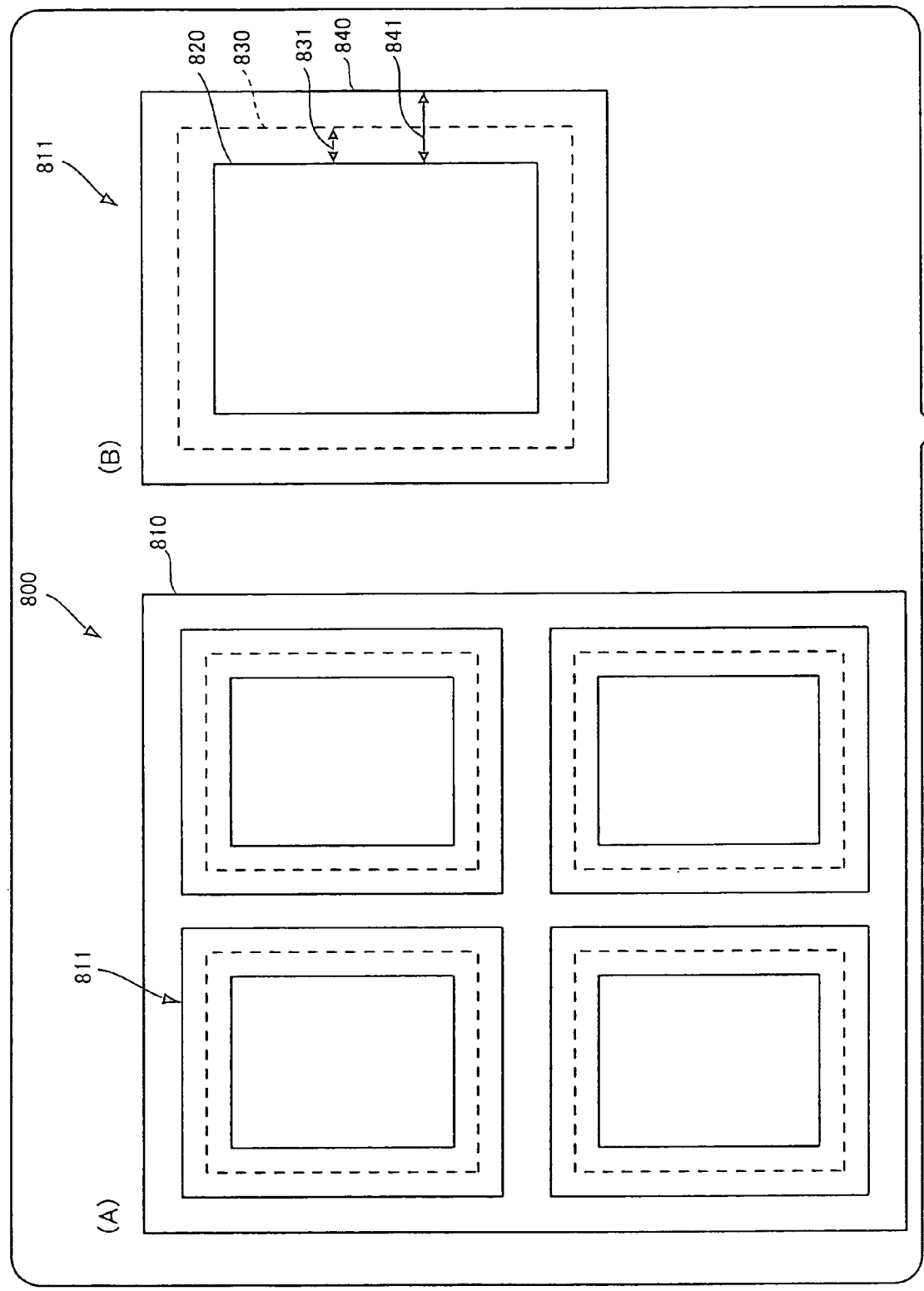
FIG. 17 is an explanatory view useful for understanding a layout received by a page size adjusting section.

FIG. 17 is an explanatory view useful for understanding the layout created by the layout creating section 173. In a layout 800 shown in a part (A) of FIG. 17, there is set up a paper frame 810 of the paper size designated by an operator. The paper frame 810 is divided into four page areas 811. A part (B) of FIG. 17 shows one page area 811 of four page areas 811 shown in the part (A) of FIG. 17. In the page area 811, there are set up a page frame 820 of the page size designated by an operator, a bleed frame 830 including the page frame 820 with a designated bleed width 831, and an imaginary page frame 840 including the page frame 820 with a designated imaginary width 841. The page frame 820 corresponds to an example of the page frame referred to in the present invention. Likely, the margin located between the bleed frame 830 and the page frame 820 corresponds to an example of the margin referred to in the present invention. The imaginary page frame 840 corresponds to an example of the imaginary page frame referred to in the present invention. The layout 800 corresponds to an example of the layout referred to in the present invention. The layout creating section 173 transmits the created layout to the paper image creating section 172 and transmits the imaginary page frame as the reference size to the page size adjusting section 171.

The page size adjusting section 171 receives the imaginary page frame as the reference size from the layout creating section 173 and receives pages from the page creating apparatus 60 (a step (b') in FIG. 15).

Figure 18:
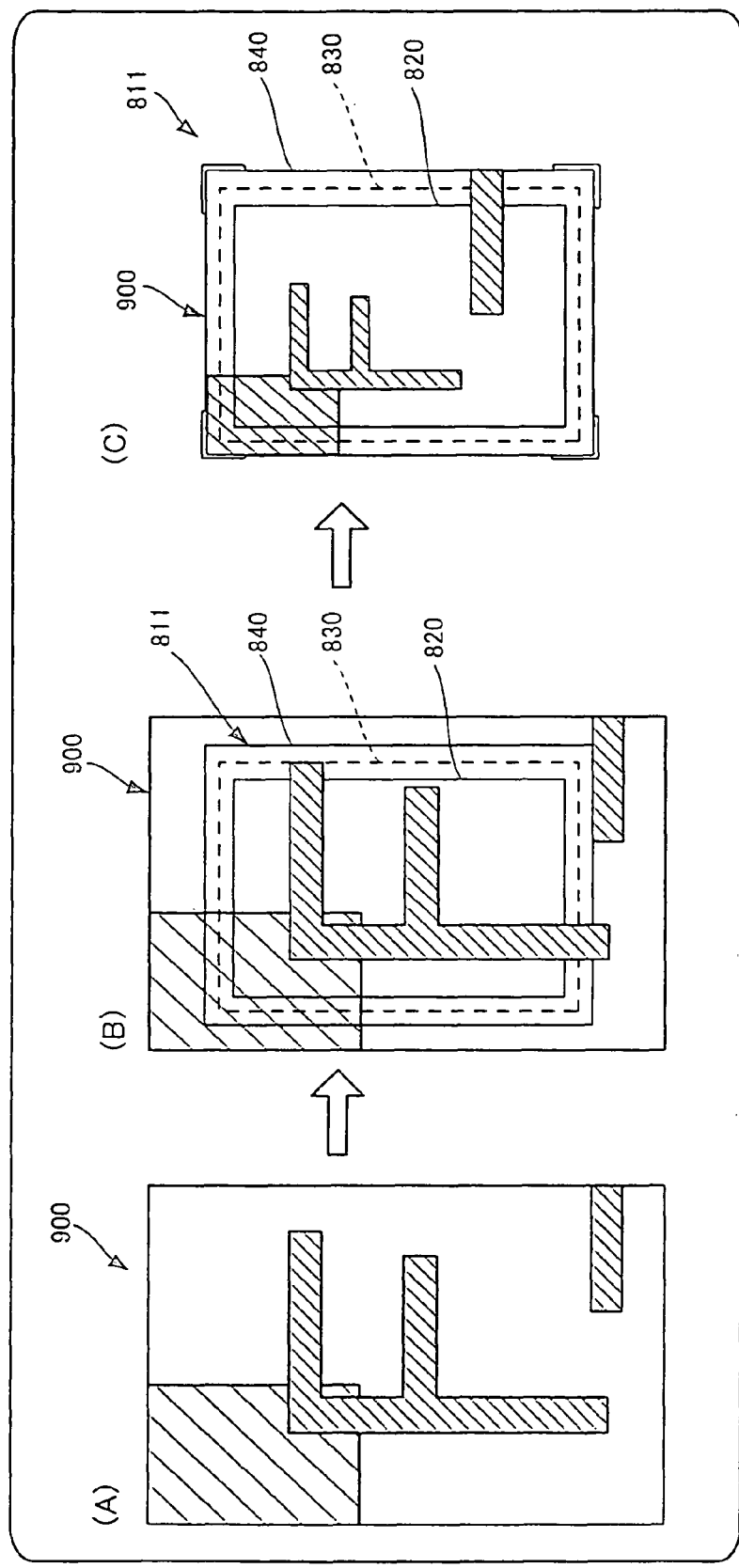
FIG. 18 is a view showing a page received by a page size adjusting section, and a page area in which the page is disposed on the layout shown in FIG. 17.

FIG. 18 is a view showing a page received by the page size adjusting section 171, and a page area 811 in which the page is disposed on the layout 800 shown in FIG. 17.

A part (A) of FIG. 18 shows a page 900, which the page size adjusting section 171 receives. A part (B) of FIG. 18 shows the page area 811 wherein the received page 900 is disposed on the page area 811 on the layout 800 shown in FIG. 17. According to the present embodiment, the page 800 juts out from the page frame 820 and the bleed frame 830 of the page area 811, and is a page of an apparently too large size.

The page size adjusting section 171 reduces the page 500 transmitted from the page creating apparatus 60 of FIG. 2 to meet the size of the imaginary page frame 840 set up as the reference size (a step (c') of FIG. 15), and transmits the page after the size adjustment to the paper image creating section 172.

In the step (d') of FIG. 15, the paper image creating section 172 receives the page after the size adjustment, and arranges the page on the page area 811 of the layout 800 of FIG. 17.

A part (C) of FIG. 18 shows the page area 811 where the page 900 after the size adjustment is disposed on the page area 811 of the layout 800 of FIG. 17. The page 900 after the size adjustment is adjusted to the same size as the imaginary page frame 840.

Next, the process goes to a step (e') of FIG. 15. Assuming that the page size adjusting section 171 receives pages other than page 900 shown in FIG. 18, the explanation will be continued returning to the step (c').

Figure 19:
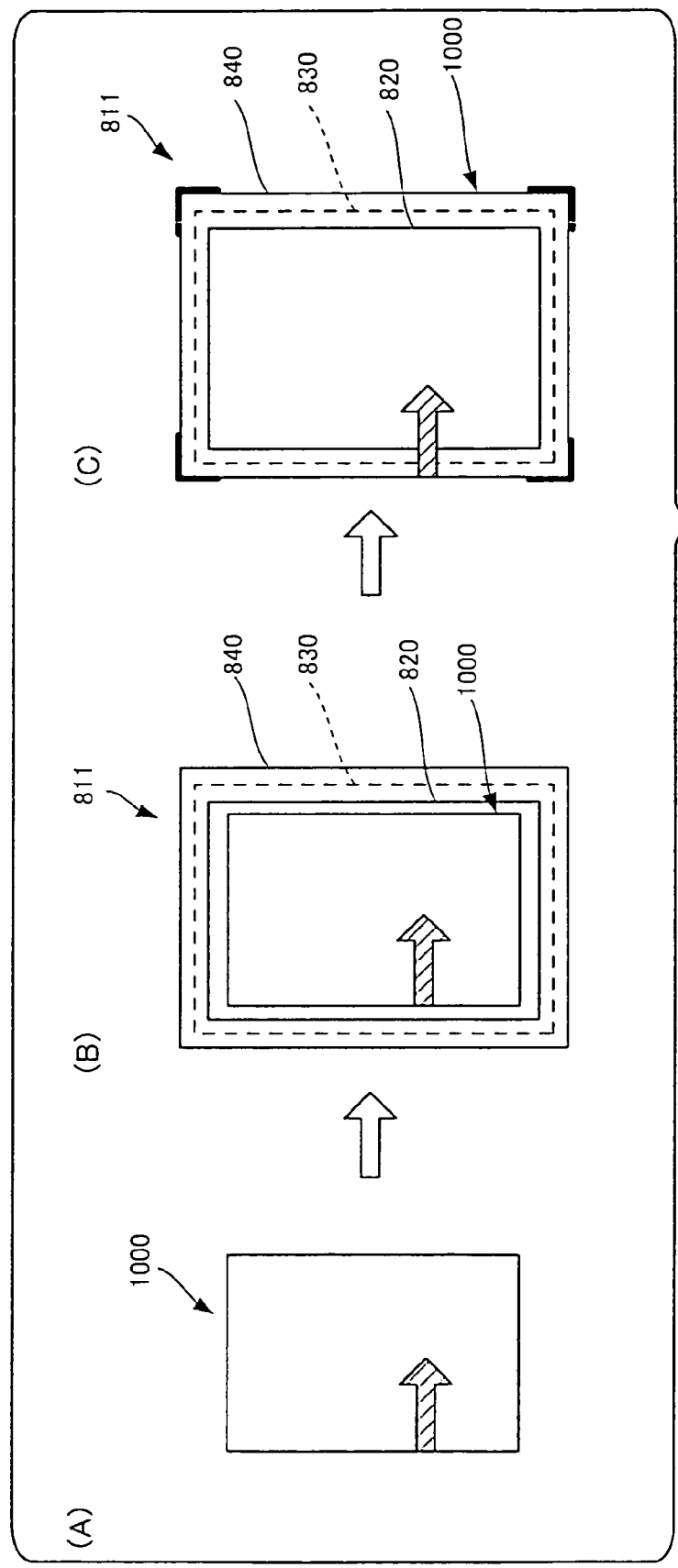
FIG. 19 is a view showing a page received by a page size adjusting section, and a page area in which the page is disposed on the layout shown in FIG. 17.
Figure 20:
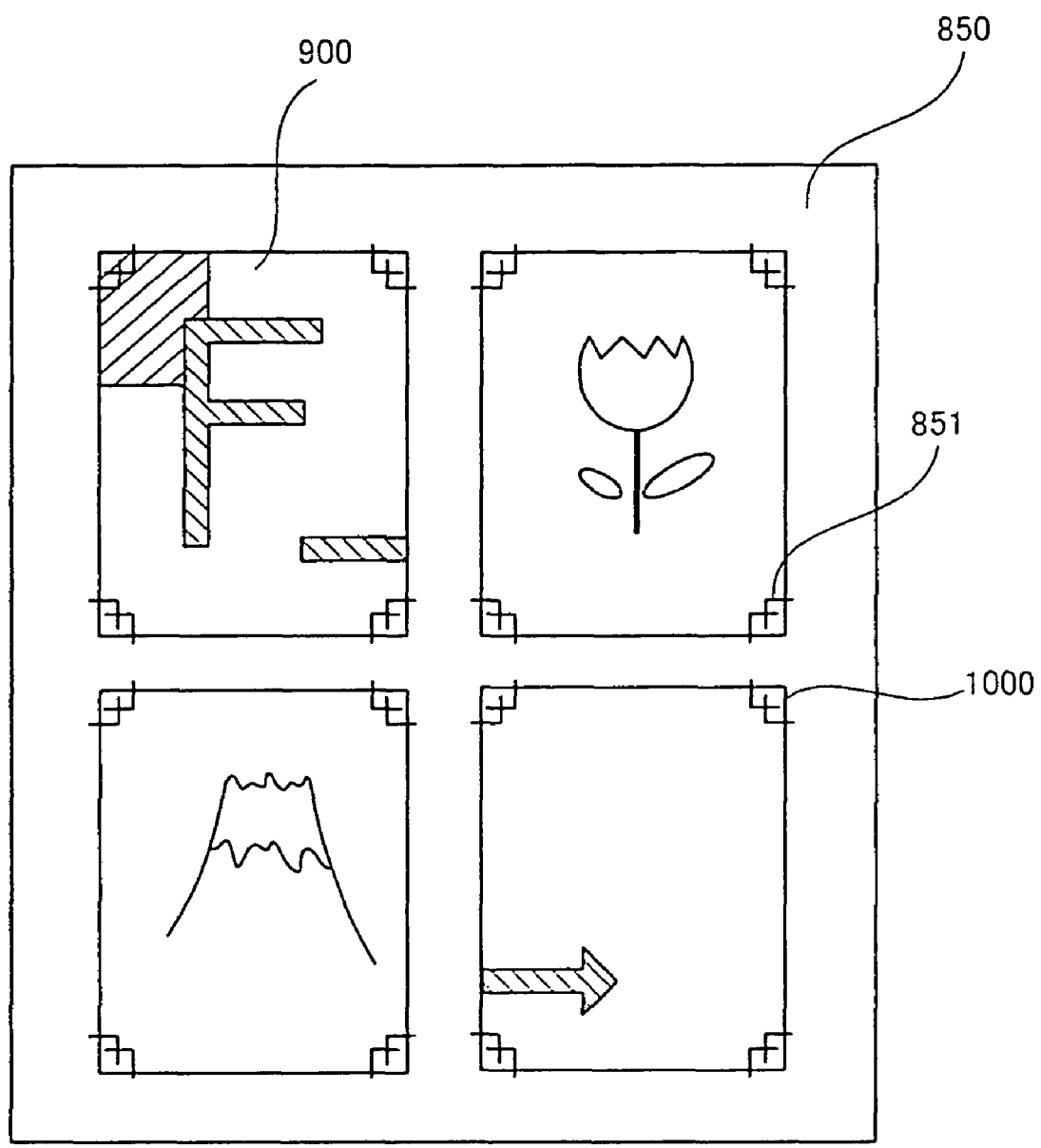
FIG. 20 is a view showing a paper image created in a paper image creating section in accordance with another embodiment of the present invention.

FIG. 19 is a view showing a page received by the page size adjusting section 171, and a page area in which the page is disposed on the layout 800 shown in FIG. 17.

A part (A) of FIG. 19 shows a page 1000, which the page size adjusting section 171 receives. A part (B) of FIG. 19 shows a page area wherein the received page 1000 is disposed on the page area on the layout 800 shown in FIG. 17. According to the present embodiment, the page 1000 is smaller than the page frame 820 of the page area. The page size adjusting section 171 enlarges the page 1000 to meet the size of the imaginary page frame 840 set up as the reference size (a step (c') of FIG. 15), and transmits the page after the size adjustment to the paper image creating section 172 in a similar fashion to that of the page 900 shown in FIG. 18.

A part (C) of FIG. 19 shows a page area where the page 1000 after the size adjustment is disposed on the page area of the layout 800 of FIG. 17. The page 1000 after the size adjustment is adjusted to the same size as the imaginary page frame 840 in a similar fashion to that of the page 900 shown in the part (C) of FIG. 18.

Processing of the step (c') and the step (d') of FIG. 15 is carried out in connection with all the pages transmitted from the page creating apparatus 60 in FIG. 2 to the page size adjusting section 171. When an arrangement for all the pages is completed in a step (e') of FIG. 15, the process goes to a step (f') of FIG. 15.

In the step (f') of FIG. 15, the paper image creating section 172 sets up a register mark, which is a mark when the paper is cut, on the layout in which pages are arranged.

In the step (g') of FIG. 15, the paper image creating section 172 creates a paper image representative of the whole of the paper frame on the layout in which pages are arranged.

FIG. 12 is a view showing a paper image created in the paper image creating section 172. In a paper image 850, there are arranged four pages as a page 900 and a page 1000. The paper image 850 has register marks 851. All the pages are larger than the area encircled by the register marks 851. But an image portion, which juts out from the area, is cut. The paper image creating section 172 transmits the paper image 850 to the image developing apparatus 80 and the storage apparatus 90 in FIG. 2.

The storage apparatus 90 in FIG. 2 stores therein the paper image transmitted from the paper image creating section 172. The image developing apparatus 80 receives the paper image from the paper image creating section 172 and develops the format of image data representative of the paper image from the page description data to the bit map data. A halftone dot of paper image represented by the developed image data is transmitted to the color printer 30 in FIG. 2 so as to be outputted on the paper (a step (i') of FIG. 15).

In this manner, when an erroneous larger size of page is obtained, the paper image is created after the page is adjusted, and thus it is possible to reduce the printing error. Oppositely, when an erroneous smaller size of page is obtained, an adjustment of the page to a size to meet the imaginary page frame makes it possible to apply the bleed.

According to the present embodiment, while the imposition apparatus is provided with the page size adjusting section in which a page is adjusted to the same size as the imaginary page frame, it is acceptable that the page size adjusting section referred to in the present invention performs the size adjustment coinciding a page with a part of an imaginary page frame, for example, performs the size adjustment with the same ratio in length and breadth so that the breadth of the page coincides with the breadth of the imaginary page frame.

Further, according to the present embodiment, while there is used the layout in which four page frames are arranged in the imposition on the paper, the layout used in the imposition apparatus of the present invention is not restricted to the four page frames as far as at least one page frame is concerned on the paper.

Still further, according to the present embodiment, while there is explained an imposition apparatus in which an operator designates a paper size and a page size so that a layout according to the associated values is applied, it is acceptable that the imposition apparatus of the present invention applies a predetermined layout.

As mentioned above, according to the present invention, it is possible to suppress a printing error.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An imposition apparatus comprising:
    a storage unit including:
        a paper image creating section that creates a paper image in a manner that an imposition for at least one page frame is applied onto a paper, and a page including an image and/or a character disposed in the page frame on a layout in which an imaginary page frame including the page frame is set up, so that the entire paper, in which the page is disposed, is provided in form of an image;
        an output processing section that causes an image output machine for outputting an image on the paper to output the paper image on the paper by applying the paper image created in the paper image creating section to the image output machine; and
        a processing interruption section that interrupts and stops the creation of the paper image by the paper image creating section and the output of the created paper image on the paper by the output processing section in the event that the page disposed on the layout juts out from the imaginary page frame, and wherein due to an interruption by the process interruption section no image is printed.

2. An imposition apparatus according to claim 1, wherein the imaginary page frame includes a predetermined width of margin surrounding a periphery of the page frame.

3. An imposition apparatus of claim 1 wherein said page is within boundary of said imaginary page frame.

4. An imposition apparatus of claim 3 wherein said page is outside boundary of said page frame.

5. An imposition apparatus of claim 1, wherein said paper image creating section sets up a register mark, which is a mark when the paper is cut, on the layout in which a page is disposed.

6. An imposition apparatus of claim 5, wherein the paper image creating section creates a paper image which includes a plurality of register marks.

7. An imposition apparatus of claim 6, wherein an image portion which juts out of the area encircled by the register mark is cut.

8. An imposition apparatus of claim 1, wherein a user manually sets the size of the imaginary page frame and the size of the paper.

9. An imposition program storage medium storing an imposition program, the imposition program comprising:
    a paper image creating section that creates a paper image in a manner that an imposition for at least one page frame is applied onto a paper, and a page including an image and/or a character disposed in the page frame on a layout in which an imaginary page frame including the page frame is set up, so the entire paper, in which the page is disposed, is provided in form of an image;
    an output processing section that causes an image output machine for outputting an image on the paper to output the paper image on the paper by applying the paper image created in the paper image creating section to the image output machine; and
    a processing interruption section for interrupting and stopping the creation of the paper image by the paper image creating section and the output of the created paper image on the paper by the output processing section in the event that the page disposed on the layout juts out from the imaginary page frame, and wherein due to an interruption by the process interruption section no image is printed.

* * * * *